(12) United States Patent
Jalal et al.

(10) Patent No.: US 12,380,177 B2
(45) Date of Patent: Aug. 5, 2025

(54) ROOT CAUSE ANALYSIS USING GRANGER CAUSALITY

(71) Applicant: International Business Machines Corporation, Armonk, NY (US)

(72) Inventors: Ajil Jalal, Austin, TX (US); Karthikeyan Shanmugam, Elmsford, NY (US); Bhanukiran Vinzamuri, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 18/491,317

(22) Filed: Oct. 20, 2023

(65) Prior Publication Data
US 2024/0160694 A1 May 16, 2024

Related U.S. Application Data

(63) Continuation of application No. 17/643,470, filed on Dec. 9, 2021, now Pat. No. 11,816,178, which is a
(Continued)

(51) Int. Cl.
*G06F 15/16* (2006.01)
*G01M 99/00* (2011.01)
(Continued)

(52) U.S. Cl.
CPC .......... *G06F 17/16* (2013.01); *G01M 99/005* (2013.01); *G05B 23/0281* (2013.01);
(Continued)

(58) Field of Classification Search
CPC ........ G06F 17/16; G06F 11/079; G06F 17/18; G06F 11/3419; G06F 11/3612;
(Continued)

(56) References Cited

U.S. PATENT DOCUMENTS

| | | |
|---|---|---|
| 7,509,229 B1 | 3/2009 | Wen |
| 8,255,346 B2 | 8/2012 | Abe et al. |

(Continued)

FOREIGN PATENT DOCUMENTS

| | | |
|---|---|---|
| CN | 104537418 A | 4/2015 |
| CN | 105867345 A | 8/2016 |

(Continued)

OTHER PUBLICATIONS

International Search Report and Written Opinion received for PCT application No. PCT/IB2020/061478 dated Mar. 15, 2021, 10 pages.
(Continued)

*Primary Examiner* — Hamza N Algibhah
(74) *Attorney, Agent, or Firm* — Amin, Turocy & Watson, LLP

(57) ABSTRACT

Techniques regarding root cause analyses based on time series data are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise maintenance component that can detect a cause of failure for a mechanical system by employing a greedy hill climbing process to perform a polynomial number of conditional independence tests to determine a Granger causality between variables from time series data of the mechanical system given a conditioning set.

20 Claims, 18 Drawing Sheets

Related U.S. Application Data continuation of application No. 16/710,893, filed on Dec. 11, 2019, now Pat. No. 11,238,129.

(51) Int. Cl.

| | |
|---|---|
| *G05B 23/02* | (2006.01) |
| *G06F 9/54* | (2006.01) |
| *G06F 11/07* | (2006.01) |
| *G06F 17/16* | (2006.01) |
| *G06F 17/18* | (2006.01) |
| *G06N 20/00* | (2019.01) |
| *H04L 29/06* | (2006.01) |
| *H04L 41/0631* | (2022.01) |

(52) U.S. Cl.
CPC ............ *G06F 11/079* (2013.01); *G06F 17/18* (2013.01); *G06N 20/00* (2019.01); *H04L 41/0631* (2013.01)

(58) Field of Classification Search
CPC . G06F 11/3684; G06N 20/00; G05B 23/0281; H04L 41/0631
USPC .......................................................... 709/224
See application file for complete search history.

(56) References Cited

U.S. PATENT DOCUMENTS

| | | | | |
|---|---|---|---|---|
| 10,467,132 | B1* | 11/2019 | Chatterjee | G06Q 10/0639 |
| 10,955,818 | B2* | 3/2021 | Qin | G05B 19/408 |
| 2005/0234973 | A1* | 10/2005 | Zeng | G06N 5/00 |
| 2007/0234157 | A1 | 10/2007 | Rajski et al. | |
| 2008/0201397 | A1* | 8/2008 | Peng | G06Q 10/0639 |
| | | | | 708/308 |
| 2009/0093893 | A1* | 4/2009 | Miller | G05B 23/0289 |
| | | | | 700/30 |
| 2009/0150325 | A1 | 6/2009 | De et al. | |
| 2009/0171879 | A1 | 7/2009 | Bullen et al. | |
| 2010/0249976 | A1* | 9/2010 | Aharoni | G05B 23/0229 |
| | | | | 700/110 |
| 2012/0049881 | A1* | 3/2012 | Johnson | G01R 31/2894 |
| | | | | 324/762.01 |
| 2015/0074035 | A1* | 3/2015 | Narasappa | G06N 7/005 |
| | | | | 706/52 |
| 2016/0350203 | A1* | 12/2016 | Doganata | G06F 8/70 |
| 2017/0006135 | A1 | 1/2017 | Siebel et al. | |
| 2017/0031742 | A1* | 2/2017 | Jilani | G06F 11/0787 |
| 2017/0102984 | A1* | 4/2017 | Jiang | G06F 11/0787 |
| 2018/0100890 | A1* | 4/2018 | Duvvury | G01R 31/002 |
| 2018/0308350 | A1* | 10/2018 | Avni | G08G 1/14 |
| 2019/0165988 | A1 | 5/2019 | Wang et al. | |
| 2019/0171187 | A1* | 6/2019 | Cella | G05B 23/0221 |
| 2019/0196458 | A1 | 6/2019 | Wei et al. | |
| 2019/0227860 | A1* | 7/2019 | Gefen | G06F 11/0709 |
| 2020/0103878 | A1* | 4/2020 | Sayyar | G05B 13/042 |
| 2020/0103895 | A1* | 4/2020 | Sayyar | G05B 23/0254 |
| 2020/0287923 | A1* | 9/2020 | Raghavendra | G06N 5/022 |
| 2020/0401470 | A1* | 12/2020 | Jung | H04L 67/12 |
| 2021/0067401 | A1* | 3/2021 | Abe | H04L 41/0631 |
| 2021/0072740 | A1* | 3/2021 | Huang | G06F 17/18 |
| 2021/0141900 | A1* | 5/2021 | Brown | G06F 21/566 |

FOREIGN PATENT DOCUMENTS

| | | |
|---|---|---|
| CN | 107301119 A | 10/2017 |
| EP | 2 458 178 A2 | 5/2012 |
| JP | 2008117383 A | 5/2008 |
| JP | 2011034208 A | 2/2011 |
| JP | 2019036061 A | 3/2019 |

OTHER PUBLICATIONS

Ma, Xiaomei Analysis and Research on the Root Cause of Alarm Based on Bayesian Network China Excellent Master Degree Thesis Database, Apr. 30, 2018, 7-14, 1-3 pages.

Glymour et al., "Review of Causal Discovery Methods Based on Graphical Models", Frontiers in Genetics, vol. 10, No. 524, Jun. 4, 2019, 15 pages.

Wu et al., "K-PdM: KPI-Oriented Machinery Deterioration Estimation Framework for Predictive Maintenance Using Cluster-Based Hidden Markov Model", IEEE Access, 6, 41676-41687, 12 pages.

Liu et al., "Root-cause Analysis for Time-series Anomalies via Spatiotemporal Graphical Modeling in Distributed Complex System", arXiv:1605.06421v2 [cs.LG], May 31, 2018, 6 pages.

Huang et al., "Causal Discovery and Forecasting in Nonstationary Environments with State-space Models", arXiv:1905.10857v2 [cs.LG], Jul. 31, 2019, 24 pages.

Akoglu et al., "Graph-based Anomaly Detection and Description: A Survey", arXiv:1404.4679v2 [cs.SI], Apr. 28, 2014, 68 pages.

Ahmad et al., "Unsupervised Real-time Anomaly Detection for Streaming Data", Neurocomputing, 262, Jun. 7, 2017, 14 pages.

Arnold et al., "Temporal Causal Modeling with Graphical Granger Methods", Proceedings of the 13th Acm Sigkdd International Conference on Knowledge Discovery and Data Mining, Aug. 12-15, 2007, 10 pages.

Yeh et al., "Matrix Profile IV: Using Weakly Labeled Time Series to Predict Outcomes", Proceedings of the VLDB Endowment, 10(12), 2017, 11 pages.

Jeyakumar et al., "ExplainIt!—A Declarative Root-cause Analysis Engine for Time Series Data (Extended Version)", arXiv:1903.08132v2 [cs.DB], Mar. 22, 2019, 21 pages.

Tsamardinos et al., "The Max-min Hill-climbing Bayesian Network Structure Learning Algorithm", Machine learning, 65.1, 2006, 48 pages.

Pegueroles et al., "Structure Learning from Time Series with False Discovery Control", arXiv:1805.09909v1 [stat.ML], May 24, 2018, 8 pages.

Fisher, Ronald Aylmer, "The Distribution of the Partial Correlation Coefficient", Metron, 3, 1924, 4 pages.

Sen et al., "Model-Powered Conditional Independence Test", arXiv:1709.06138v1 [stat.ML], Sep. 18, 2017, 20 pages.

Strobl et al., "Approximate Kernel-based Conditional Independence Tests for Fast Non-Parametric Causal Discovery", arXiv:1702.03877v2 [stat. ME], Apr. 13, 2017, 25 pages.

Mell et al., "The NIST Definition of Cloud Computing", Recommendations of the National Institute of Standards and Technology, NIST Special Publication 800-145, Sep. 2011, 7 pages.

Non-Final Office Action received for U.S. Appl. No. 16/710,893 dated Jul. 9, 2021, 89 pages.

Notice of Allowance received for U.S. Appl. No. 16/710,893 dated Nov. 18, 2021, 28 pages.

Non-Final Office Action received for U.S. Appl. No. 17/643,470 dated Feb. 16, 2023, 30 pages.

Notice of Allowance received for U.S. Appl. No. 17/643,470 dated Jul. 14, 2023, 33 pages.

List of IBM Patents or Applications Treated as Related.

Decision to Grant a Patent for Japanese Patent Application No. 2022-534481, dated Apr. 12, 2024.

\* cited by examiner

Algorithm : MMPC-p-Reduced

Data: $j$, Data, $\alpha$, $K$

Result: $\text{Pa}(j)$, the parents of $X_j$

1    $CP(j) = \emptyset$, $\mathcal{P}(i \to j) = \emptyset$, $\forall i \neq j$ ;

/* Phase I */

2    repeat

3       $P = \arg\max_{i \neq j} \min_{F \subset CP(j): |F| \geq |CP(j)| - K} \text{Assoc}_\alpha(i \to j; F)$;

4       $assocP = \max_{i \neq j} \min_{F \subset CP(j): |F| \geq |CP(j)| - K} \text{Assoc}_\alpha(i \to j; F)$;

5       if $assocP > 0$ then

6          $CP(j) = CP(j) \cup P$;

7    until $assocP = 0$;

8    for $Y \in CP(j)$ do

9       $assocY = \min_{F \subset CP(j) \setminus Y} \text{Assoc}_\alpha(Y \to j; F)$;

10      $F_{\min} = \arg\min_{F \subset CP(j) \setminus Y} \text{Assoc}_\alpha(Y \to j; F)$ ;

11      if $assocY \neq 0$ then

12         for $F \subset CP(j) \setminus Y$ do

13            $p \leftarrow$ p-value from $DI(Y \to j; F)$;

14            if $p \leq \alpha$ then

15               Insert $p$ into $\mathcal{P}(Y \to j)$ ;

16         end

17      else

18         $CP(j) = CP(j) \setminus Y$;

19         Empty $\mathcal{P}(Y \to j)$ ;

20    end

21    $\mathcal{P}(Y \to j) = \max\{\mathcal{P}(Y \to j)\}$;

22    return $CP(j), \mathcal{P}$

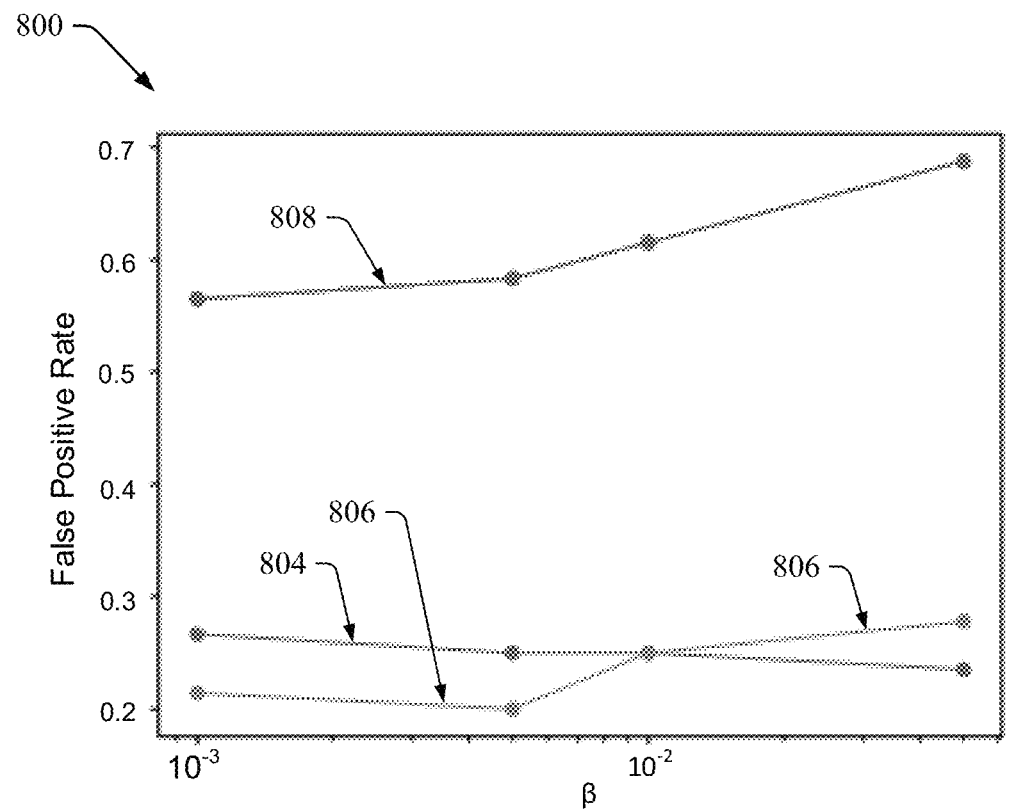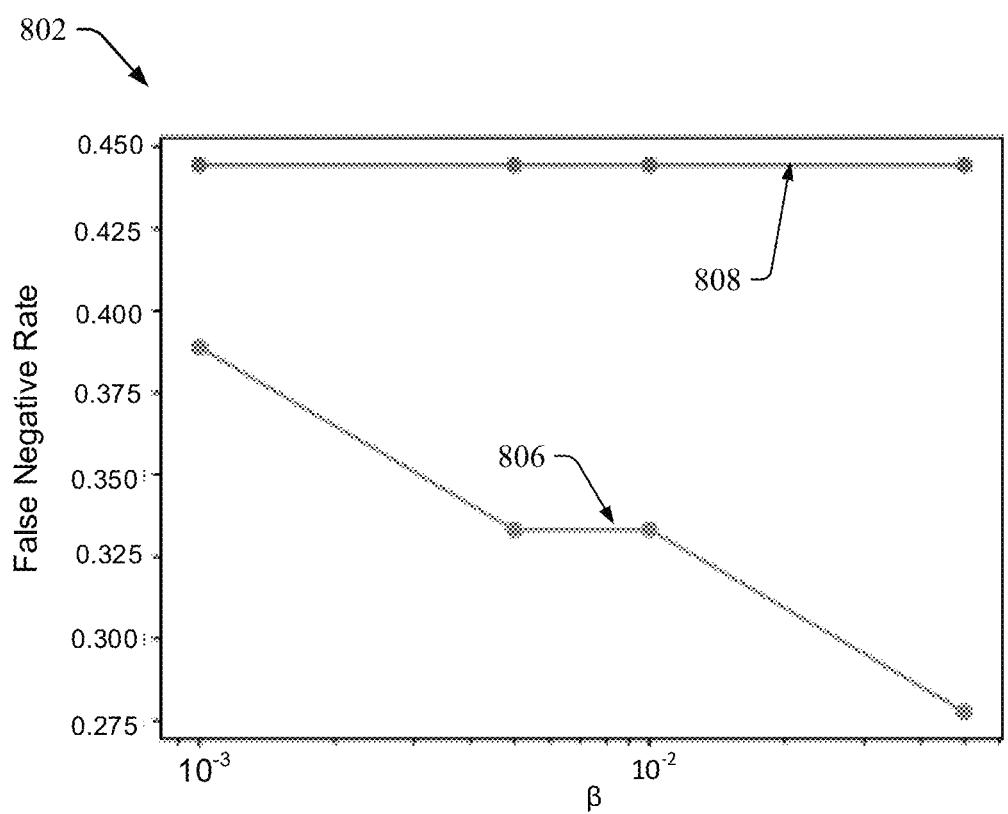
FIG. 8

ROOT CAUSE ANALYSIS USING GRANGER CAUSALITY

BACKGROUND

The subject disclosure relates to one or more root cause analyses that can be based on Granger causality between time series data variables, and more specifically, to determining the cause and/or onset of one or more failures of a mechanical system based on one or more Granger causalities between time series data variables.

Mechanical failures in large scale industrial systems can result in significant financial losses. In many cases, an individual part, or set of parts, in the system can malfunction, wherein the malfunction then propagates to other parts and/or sections of the system. Propagation of the malfunction can result in a collective failure of the whole system. The one or more parts that initially malfunction are commonly referred to as the root cause for the system failure. Often there can be a delay between the root cause event and the collective system failure. For example, the malfunction can propagate from the root cause to the system failure over a period of time (e.g., days, weeks, and/or months). Conventional analyses of the system failures involve a subject matter expert who can fix the system after the failure event. In some instances, the expert can identify the root cause of the system failure, but it is often impossible for the expert to accurately identify the when the root cause initiated (e.g., the onset of the system failure).

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard a root cause analysis based on one or more Granger causalities between time series data variables are described.

According to an embodiment, a system is provided. The system can comprise a memory that can store computer executable components. The system can also comprise a processor, operably coupled to the memory, and that can execute the computer executable components stored in the memory. The computer executable components can comprise a maintenance component that can detect a cause of failure for a mechanical system by employing a greedy hill climbing process to perform a polynomial number of conditional independence tests to determine a Granger causality between variables from time series data of the mechanical system given a conditioning set. An advantage of such a system can be an increased efficiency in the execution of a causal discovery algorithm due to the use of a polynomial number of conditional independence tests rather than an exponential number of tests.

Another advantage of such a system can be determination of when a root cause first initiated a degradation of the mechanical system's operations.

According to an embodiment, a computer-implemented method is provided. The computer-implemented method can comprise detecting, by a system operatively coupled to a processor, a cause of failure for a mechanical system by employing a greedy hill climbing process to perform a polynomial number of conditional independence tests to determine a Granger causality between variables from time series data of the mechanical system given a conditioning set. An advantage of such a computer-implemented method can be the use of machine learning to minimize the need for human interaction to identify the root cause.

According to another embodiment, a computer-implemented method is provided. The computer-implemented method can comprise detecting, by a system operatively coupled to a processor, an onset of failure for a mechanical system by employing a greedy hill climbing process to perform a polynomial number of conditional independence tests to determine a Granger causality between variables from time series data of the mechanical system given a conditioning set. An advantage of such a computer-implemented method can be a reduction in the run time of a causal discovery algorithm used to execute the greedy hill climbing process due to the use of a polynomial number of conditional independence tests.

According to an embodiment, a computer program product for analyzing a failure of a mechanical system is provided. The computer program product can comprise a computer readable storage medium having program instructions embodied therewith. The program instructions can be executable by a processor to cause the processor to detect, by the processor, an onset of failure for the mechanical system by employing a greedy hill climbing process to perform a polynomial number of conditional independence tests to determine a Granger causality between variables from time series data of the mechanical system given a conditioning set. An advantage of such a computer program product can be a reduction in the false discovery rate of a causal discovery algorithm used to execute the greedy hill climbing process.

BRIEF DESCRIPTION OF THE DRAWINGS

FIG. 3 illustrates a diagram of an example, non-limiting causal discovery algorithm that can be employed to determine one or more Granger causalities between variables of time series data in accordance with one or more embodiments described herein.

FIG. 8 illustrates a diagram of example, non-limiting graphs that can demonstrate the efficacy of one or more autonomous root cause analysis based on one or more Granger causalities found in time series data in accordance with one or more embodiments described herein.

DETAILED DESCRIPTION

Figure 1:
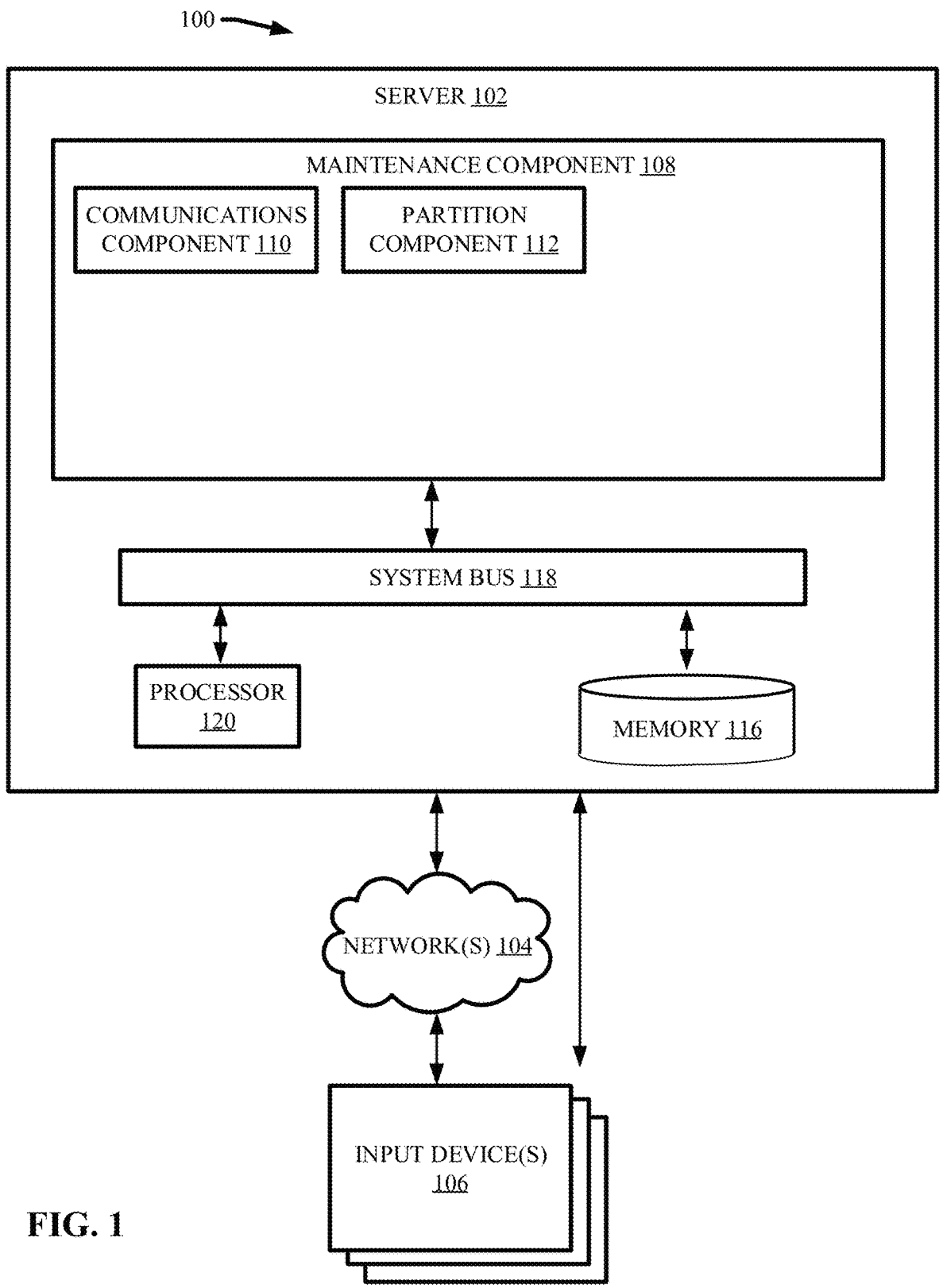
FIG. 1 illustrates a block diagram of an example, non-limiting system that can determine the root cause of a mechanical system failure and/or the onset of a mechanical system failure to facilitate preventative maintenance in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of root cause analysis of mechanical systems; the present disclosure can be implemented to produce a solution to one or more of these problems by incorporating an autonomous root cause analysis based on Granger causalities found in time series data that can determine one or more root causes and/or onsets of system failure. Advantageously, one or more embodiments described herein can enable the identification of when a root cause of a mechanical system failure occurred. Further, various embodiments described herein can identify the onset of a system failure to facilitate preventative maintenance. Thereby, the root cause analysis described in various embodiments herein can identify the onset and/or root causes of a system failure to enable preventative maintenance measures that can prevent system failure and the costs associated with a system failure.

Various embodiments of the present invention can be directed to computer processing systems, computer-implemented methods, apparatus and/or computer program products that facilitate the efficient, effective, and autonomous (e.g., without direct human guidance) root cause analysis of a mechanical system failure. For example, in one or more embodiments described herein can employ one or more greedy hill climbing processes to perform a polynomial number of conditional independence tests to determine one or more Granger causalities between variables from time series data of a mechanical system given a conditioning set. One or more embodiments described herein can identify the onset of a system failure based on an analysis of the Granger causalities. Additionally, various embodiments described herein can identify one or more root causes of a mechanical system failure and/or when the one or more root causes occurred based on an analysis of the Granger causalities.

The computer processing systems, computer-implemented methods, apparatus and/or computer program products employ hardware and/or software to solve problems that are highly technical in nature (e.g., root cause analysis of a mechanical system failure), that are not abstract and cannot be performed as a set of mental acts by a human. For example, an individual or a plurality of individuals, cannot readily monitor and/or analyze the time series data to determine Granger causality with the accuracy and efficiency of the various embodiments described herein. One or more embodiments described herein can constitute a technical improvement over conventional techniques for discovering Granger causal relationships between time series data by reducing the number of conditional independent tests from an exponential number to a polynomial number. By reducing the number of conditional independent tests required by a Granger causal discovery algorithm, the one or more embodiments described herein can determine Granger causalities with lower statistical costs than those experienced by conventional techniques. Further, various embodiments described herein can regard a practical application of a greedy hill climbing processes to perform a polynomial number of conditional independence tests to determine Granger causalities between time series data given a conditioning set to determine the onset and/or root cause of a mechanical system failure.

FIG. 1 illustrates a block diagram of an example, non-limiting system 100 that can perform one or more root cause analyses. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or input devices 106. The server 102 can comprise maintenance component 108. The maintenance component 108 can further comprise communications component 110 and/or partition component 112. Also, the server 102 can comprise or otherwise be associated with at least one memory 116. The server 102 can further comprise a system bus 118 that can couple to various components such as, but not limited to, the maintenance component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the maintenance component 108 can be provided on the one or more servers 102, it should be appreciated that the architecture of system 100 is not so limited. For example, the maintenance component 108, or one or more components of maintenance component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter time series data of a mechanical system into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more input devices 106 can comprise one or more sensors and/or detectors comprised within a mechanical system, wherein the one or more input devices 106 can collect and/or measure the time series data. Example sensors that can be comprised within the one or more input devices 106 can include, but are not limited to: temperature sensors, pressure sensors (e.g., aneroid barometer sensors, manometer sensors, bourdon tube pressure sensors, vacuum pressure sensors, a combination thereof, and/or the like), vibration sensors (e.g., accelerometers, strain gauges, capacitive displacement sensors, a combination thereof, and/or the like), ultrasonic sensors, touch sensors, proximity sensors, level sensors, smoke sensors, gas sensors, valve measuring sensors, casing pressure measuring sensors, a combination thereof, and/or the like.

In one or more embodiments, the one or more input devices 106 can be employed to enter time series data into the system 100 (e.g., via manual operation, autonomous collection, autonomous detection, and/or autonomous measurement). The time series data can regard the operation of one or more parts comprised within a mechanical system. For example, the mechanical system can be comprised within the Internet of Things ("IoT"), wherein the one or more input devices 106 can comprise one or more sensors and/or detectors that monitor operation of one or more parts of the mechanical system. The time series data can comprise data collected, detected, and/or measured by the one or more input devices 106. For instance, the time series data can include data points describing an amount of vibration, a temperature, and/or an amount of pressure that one or more parts of the mechanical system experienced during operation along with when the one or more parts experienced the data points.

For example, the operational characteristics of the various parts of the mechanical system can be represented by one or more data points that can be indexed in time order (e.g., indexed in a sequence taken at successive points in time) to establish the time series data. For instance, the one or more input devices 106 can collect, detect, and/or measure the operational state of the various parts at given time intervals, wherein the data collected, detected, and/or measured at each time interval can be time stamped and added to the data collected, detected, and/or measured at the preceding time intervals to establish the time series data. Thereby, the time series data can be manually (e.g., via one or more users) or autonomously (e.g., via one or more sensors and/or detectors) entered via the one or more input devices 106, and/or can characterize the operational state of the various parts of the mechanical system over time.

In various embodiments, the one or more input devices 106 can share the time series data with the maintenance component 108 via the communications component 110 and/or one or more networks 104. The communications component 110 can receive the time series data and share the time series data with one or more of the associate components of the maintenance component 108 described herein (e.g., via system bus 118). In one or more embodiments, the communications component 110 can receive the time series data and store the time series data in one or more memories 116 for processing by the maintenance component 108.

The partition component 112 can divide the time series data into a plurality of groups based on a defined time period interval. Example time period intervals can include, but are not limited to: hours, days, weeks, months, years, a combination thereof, and/or the like. In various embodiments, the one or more input devices 106 can be employed to define the time period interval. Additionally, the partition component 112 can store the plurality of data groups, extracted from the time series data, in the one or more memories 116. For instance, wherein the time period interval is one week, the partition component 112 can divide the time series data into a plurality of groups wherein each group comprises time series data associated with a given week. For example, wherein the time period interval is one week, time series data that characterizes the operational state of one or more parts within a mechanical system during the first week of September can be partitioned into a first group; whereas time series data that characterizes the operational state of the one or more parts during the second week of September can be partitioned into a second group.

Figure 2:
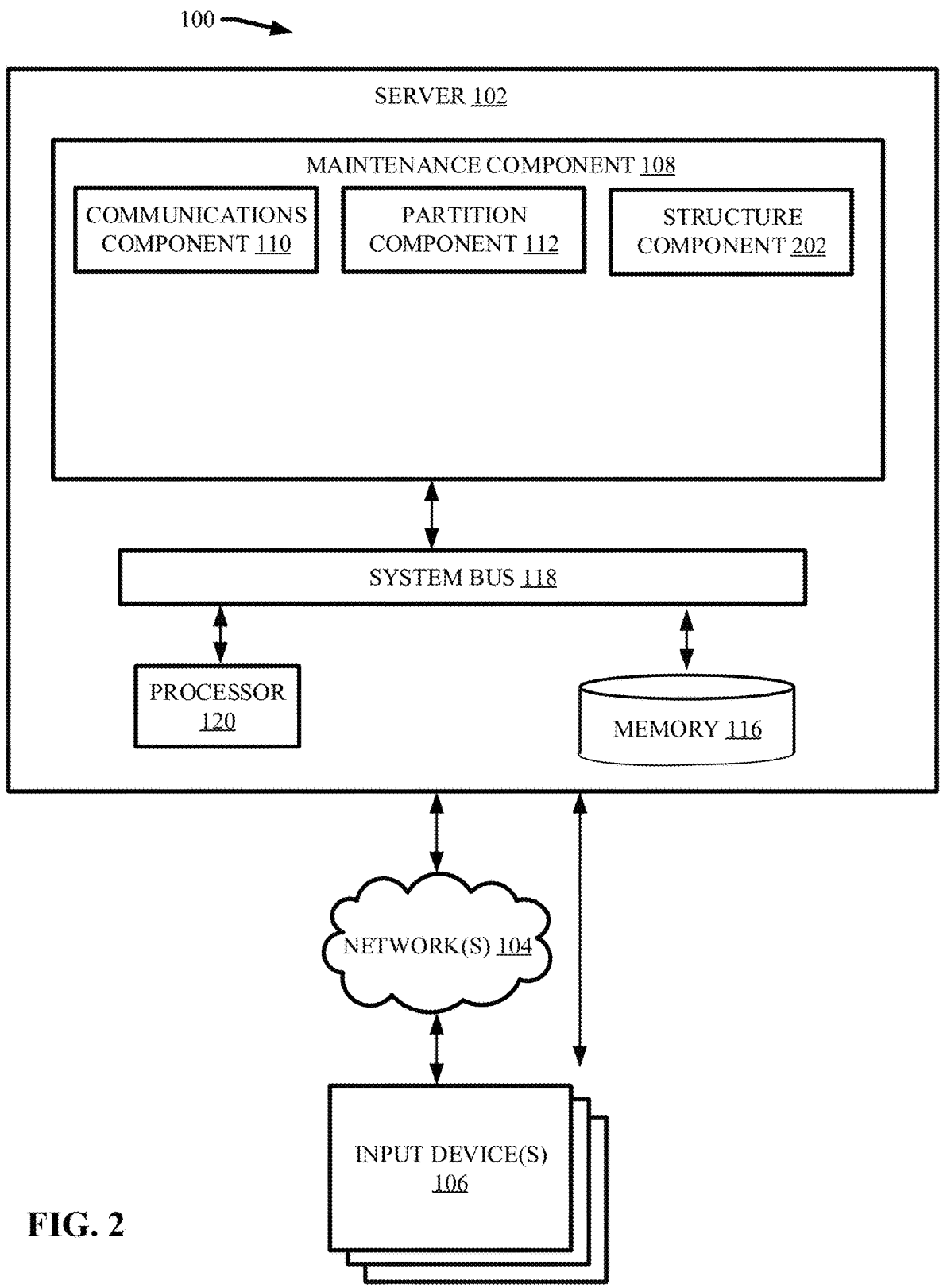
FIG. 2 illustrates a block diagram of an example, non-limiting system that can construct one or more Granger causality relationship structures regarding time series data to facilitate a root cause analysis in accordance with one or more embodiments described herein.

FIG. 2 illustrates a diagram of the example, non-limiting system 100 further comprising structure component 202 in accordance with one or more embodiments described herein. Repetitive description of like elements employed in other embodiments described herein is omitted for sake of brevity. In various embodiments, the structure component can employ one or more causal discovery algorithms for each of the defined time series data groups to generate an inferred causal relationship structure for the plurality of groups.

In one or more embodiments, the structure component 202 can employ one or more parametric or non-parametric conditional independence testers to infer the causal structure between variables comprised within the time series data groups. For instance, the structure component 202 can employ machine learning to execute one or more causal discovery algorithms, which can generate one or more Bayesian networks (e.g., directed graphs depicting relationships between variables in the time series data) using one or more conditional independence testers to performs tests to determine the presence and/or absence of an edge. Examples of conditional independence testers can include, but are not limited to: ParCorr, CCIT, and/or RCOT.

The structure component 202 can utilize the one or more conditional independence testers to determine one or more p-values, which can correspond to the probability that a hypothesized relationship between variables comprised within time series data is independent. For example, the p-value can represent the probability that a first time series data variable is independent of a second time series data variable given a third time series data variable. For instance, the p-value can correspond to the probability of the event $I(X_i \rightarrow X_j \| X_A) = 0$ for any $A \subset [1: m]$ given the time series data; wherein "i" can correspond to the first time series data variable, "j" can correspond to the second time series data variable, "A" can correspond to the third time series data variable, and/or "m" can correspond to the number of features (e.g., the dimensionality of the feature space). In various embodiments, a high p-value can be indicative of independency between the first and second time series data variables given the third time series data variable; whereas a low p-value can be indicative of dependency between the first and second time series data variables given the third time series data variable.

In one or more embodiments, the one or more conditional independency testers can be utilized by the structure component 202 to determine an association measurement characterizing the probable dependency between time series data in accordance with Equation 1 below.

$$\text{Assoc}_\alpha(i \rightarrow j; A) = \alpha - \min(\alpha, DI(i,j,A)) \quad (1)$$

Wherein "DI" can correspond to directed information, and "α" can correspond to a defined p-value threshold value. P-values greater than the p-value threshold value α can be clipped to the p-value threshold value α. Thereby, the p-value threshold value α can correspond to a maximum association between the given time series data variables. Thus, the structure component 202 can utilize the one or more conditional independency testers to determine p-values that can then correlate to association measurements in accordance with Equation 1.

Further, the structure component 202 can utilize the association measurements to execute a causal discovery algorithm for the plurality of time series data groups. During a first phase of the causal discovery algorithm, a causal graph (e.g., a Bayesian network) can be constructed based on the p-values and/or association measurements facilitated by the one or more conditional independency testers. Further, structure component 202 can reference the causal graph to identify time series data variables that have a high association (e.g., exceeding a threshold set via the one or more input devices 106) with a target time series data variable and include the identified time series data variables in a candidate parent set. Time series data variables can be repeatedly added to the candidate parent set until there are not more associations. For example, the one or more conditional independency testers can perform a polynomial number of tests to find a variable with maximum association with the target variable. During, a second phase of the causal discovery algorithm, the structure component 202 can prune the candidate parent set to remove one or more irrelevant variables (e.g., by removing false edges that were added to the causal graph during the first phase). Additionally, the structure component 202 can incorporate one or more false discovery rate controls into the causal discovery algorithm.

FIG. 3 illustrates a diagram of an example, non-limiting MMPC-p-Reduced algorithm 300 that can exemplify the one or more causal discovery algorithms that can be executed by the structure component 202 in accordance with one or more embodiments described herein. Repetitive description of like elements employed in other embodiments described herein is omitted for sake of brevity. As shown in FIG. 3, the MMPC-p-Reduced algorithm 300 can be a Bayesian network based greedy hill climbing algorithm with conditional independence testers to identify the causal graph over a set of variables from the time series data.

As shown in FIG. 3, the MMPC-p-Reduced algorithm 300 can begin by analyzing the candidate parents ("CP") of a time series data variable j initialized at ø. Further, the MMPC-p-Reduced algorithm 300 can form a conditioning set of the candidate parents based on a K value, wherein the conditioning set can equal the candidate parents minus the K value. In various embodiments, the K value can be set via the one or more input devices 106, and/or the K value can be greater than or equal to zero. For instance, wherein there are 5 candidate parents and K has a value of 1, the conditioning set can be equal to 4 candidates. Further, the number of conditional independency tests performed during the first phase of the MMPC-p-Reduce algorithm 300 can be a polynomial number of the K value. For example, the number n of conditional independency tests performed during the first phase of the MMPC-p-Reduced algorithm 300 can be equal to $n^{K+1}$. Varying the K value can trade off the size of the conditioning set, with the number of conditional independency tests performed. For example, a small K value can result in a larger conditioning set, while a large K value can result in more conditional independency tests performed.

Amongst the candidates of the conditional set, the MMPC-p-Reduced algorithm 300 can then find the minimal association between the two given time series data variables i and j (e.g., via the one or more conditional independency testers and/or the association measurements defined by Equation 1). Then the MMPC-p-Reduced algorithm 300 analyzes the parent candidates of time series data variable i that are not already in the candidate parent set of time series data variable j, such that the association measurement is maximized (e.g., conditioned on the current candidate parent set of j). Wherein a candidate parent of i is already in the candidate parent set of j, the association measurement will be zero and thereby not the maximum association. Wherein a candidate parent of i is found to have a maximum association measurement (e.g., a value greater than zero), the candidate parent of i is added to the candidate parent set of j. Thereby, candidate parents outside the initial candidate parent set of j can be analyzed to identify associations that would mark their inclusion into the candidate parent set of j (e.g., characterized by association measurements greater than 0).

Once the candidate parent set of j is established by the first phase of the MMPC-p-Reduced algorithm 300 (e.g., as described above and depicted in lines 1-7 of FIG. 3), the second phase of the MMPC-p-Reduced algorithm 300 can prune the candidate parent set (e.g., as depicted in lines 8-20 of FIG. 3). For each member Y in the candidate parent set, the MMPC-p-Reduced algorithm 300 can determine the association (e.g., via the one or more conditional independency testers and/or association measurement characterized by Equation 1) between Y and j conditioned on the remaining members of the candidate parent set to identify the member with the minimum association. Wherein the minimum association is equal to zero, the given member can be removed from the candidate parent set. Wherein the minimum association is greater than zero, the given member can be maintained. Thereby, the MMPC-p-Reduced algorithm 300 can prune the composition of the candidate parent set.

In one or more embodiments, the second phase of the MMPC-p-Reduced algorithm 300 can also determine at what p-value a given parent was added to the candidate parent set, represented by "$\mathcal{P}$" in lines 1, 19, 21, and/or 22 of FIG. 3. For example, the $\mathcal{P}$ can be used to determine one or more statistical guarantees regarding the edges of the causal graph. Additionally, in one or more embodiments, the structure component 202 can generate the causal relationship structure (e.g., by executing a causal discovery algorithm, such as MMPC-p-Reduced algorithm 300) for each of the time series data groups.

Figure 4:
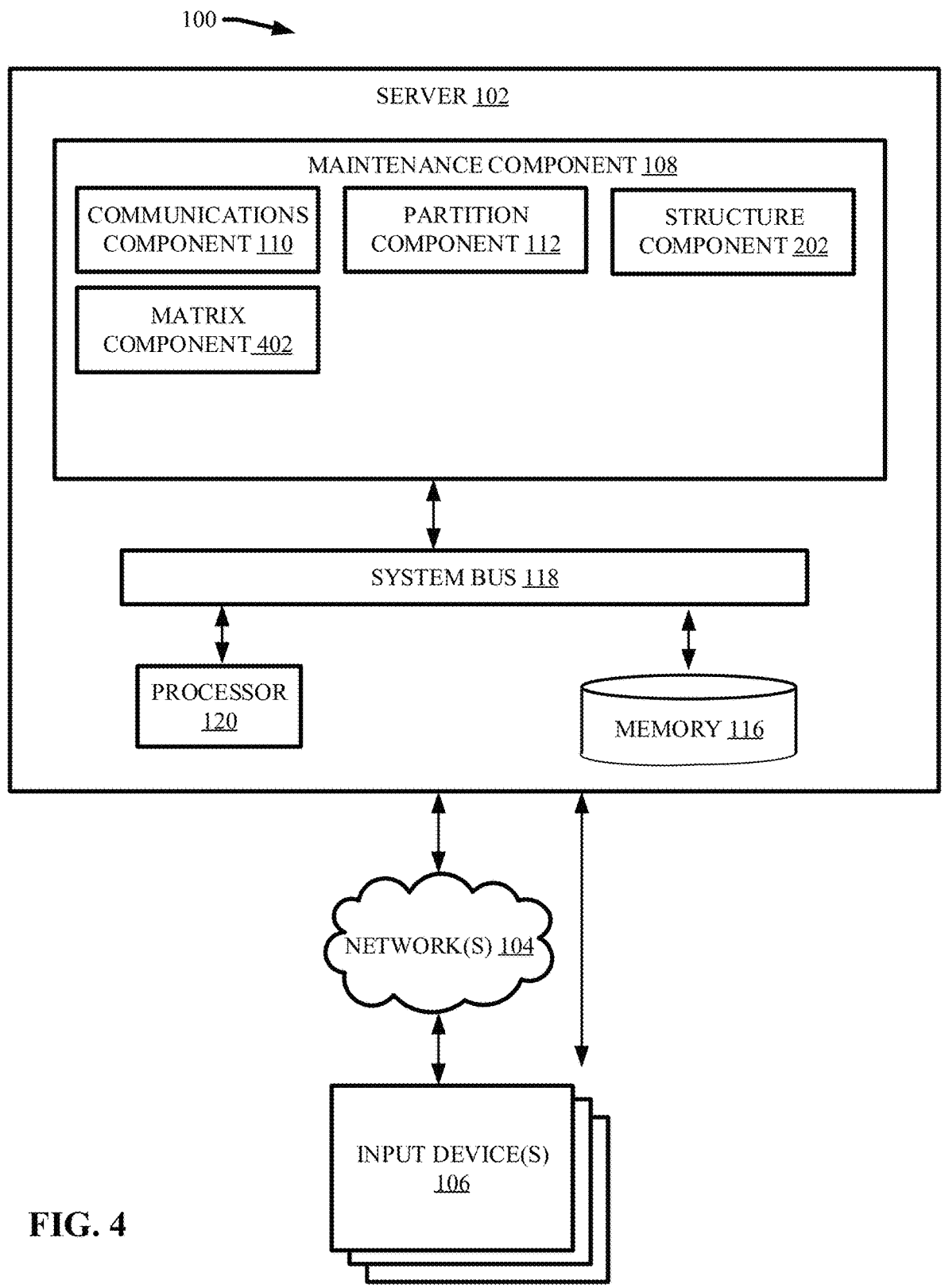
FIG. 4 illustrates a block diagram of an example, non-limiting system that can generate one or more adjacency matrices regarding time series data to facilitate a root cause analysis in accordance with one or more embodiments described herein.

FIG. 4 illustrates a diagram of the example, non-limiting system 100 further comprising matrix component 402 in accordance with one or more embodiments described herein. Repetitive description of like elements employed in other embodiments described herein is omitted for sake of brevity. In various embodiments, the matrix component 402 can construct a plurality of adjacency matrices for each of the time series data groups based on the one or more causal relationship structures derived by the structure component 202.

For example, the matrix component 402 can construct an adjacency matrix for each of the causal relationship graphs constructed by the structure component 202. The adjacency matrices can depict the parents of each time series data variable in the given group based on the determinations of the causal discovery algorithm (e.g., MMPC-p-Reduced algorithm 300). For instance, the adjacency matrices can be composed in a Boolean format (e.g., wherein each row can index the various variables within the group; each column can index the possible parents; parent candidates, as determined by the causal discovery algorithm, can correspond to a value of 1 within the matrix; and non-parents, as determined by the causal discovery algorithm, can correspond to a value of 0 within the matrix).

Figure 5:
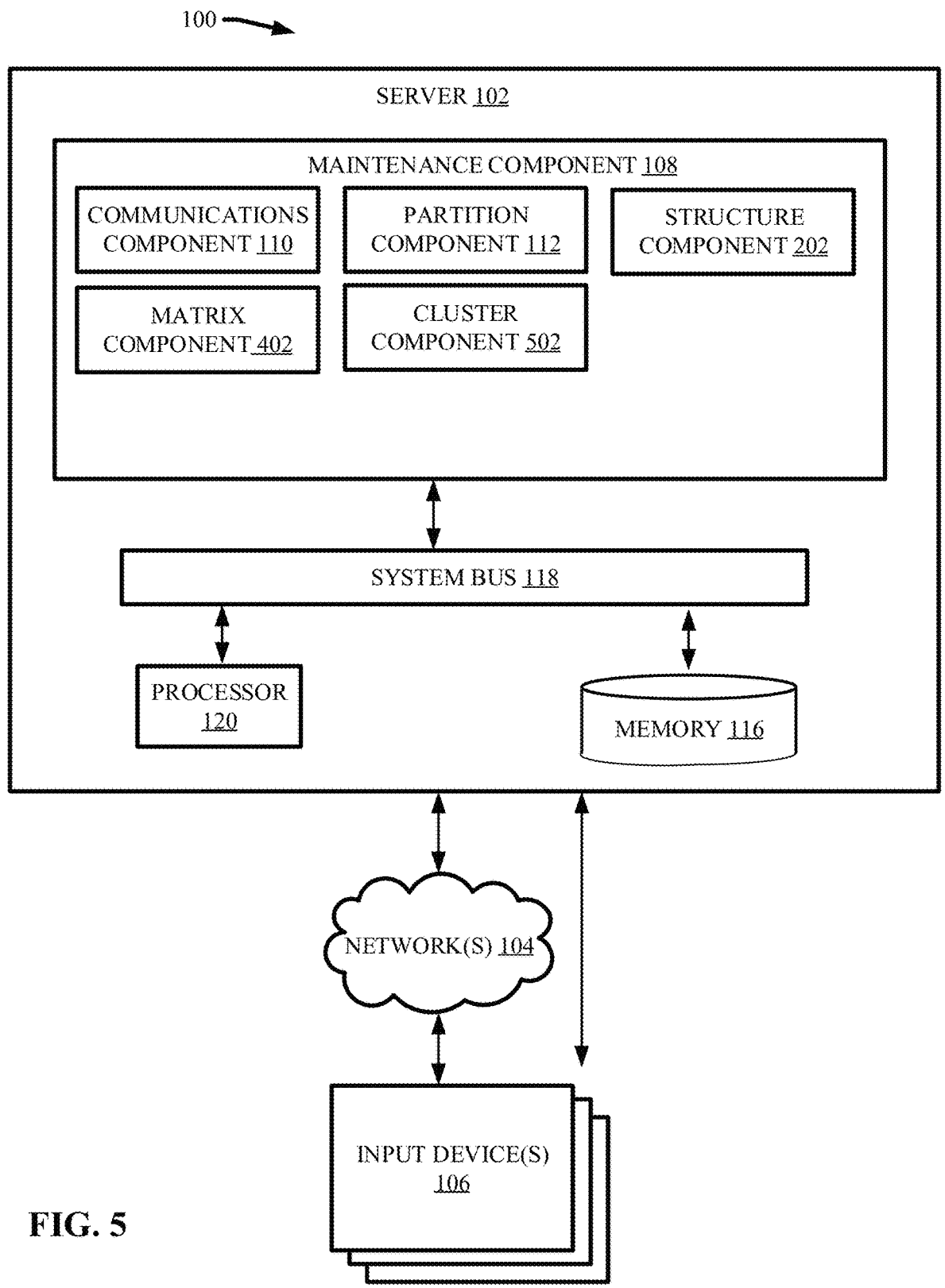
FIG. 5 illustrates a block diagram of an example, non-limiting system that can cluster one or more adjacency matrices into two distinct cluster groups to facilitate a root cause analysis in accordance with one or more embodiments described herein.

FIG. 5 illustrates a diagram of the example, non-limiting system 100 further comprising cluster component 502 in accordance with one or more embodiments described herein. Repetitive description of like elements employed in other embodiments described herein is omitted for sake of brevity. In various embodiments, the cluster component 502 can employ machine learning to perform one or more K-means clustering techniques to cluster the plurality of adjacency matrices into distinct cluster groups.

For example, a first cluster group can comprise adjacency matrices that characterize standard operation of the mechanical system. For instance, the first cluster group can comprise adjacency matrices that comprise the Granger causal relationship between time series data during a time interval in which the mechanical system is not experiencing a malfunction (e.g., each of the parts monitored by the sensors of the one or more input devices 106 are operating in a standard manner, such as within expected tolerances). A second cluster can comprise adjacency matrices that characterize non-standard operation mechanical system. For instance, the second cluster group can comprise adjacency matrices that comprise the Granger causal relationships between time series data during a time interval in which the mechanical system is experiencing a malfunction (e.g., one or more of the parts monitored by the sensors of the one or more input devices 106 are operating in a non-standard manner, such as outside expected tolerances).

In one or more embodiments, the data topology of the adjacency matrices can vary regarding time series data describing operation of a given part of the mechanical system depending on whether the given part has experienced a malfunction. Thereby, the cluster component 502 can cluster the adjacency matrices into separate cluster groups based on the data topological variances to cluster: adjacency matrices associated with standard operation of the mechanical system into the first cluster group, and adjacency matrices associated with non-standard operation (e.g., malfunctions) of the mechanical system into the second cluster group.

Figure 6:
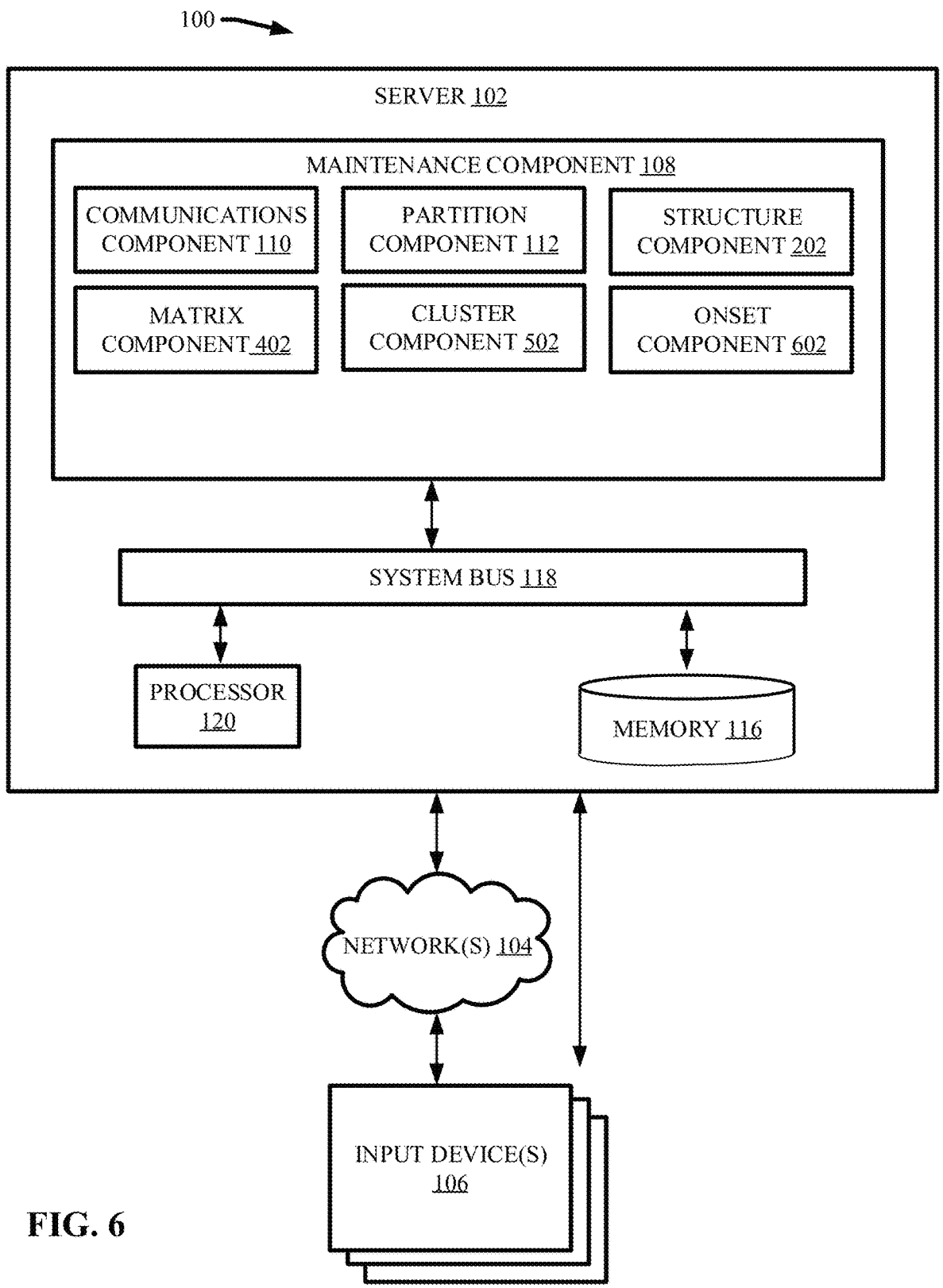
FIG. 6 illustrates a block diagram of an example, non-limiting system that can identify an onset of a system failure based clustered adjacency matrices that characterize Granger causalities between variables of time series data in accordance with one or more embodiments described herein.

FIG. 6 illustrates a diagram of the example, non-limiting system 100 further comprising onset component 602 in accordance with one or more embodiments described herein. Repetitive description of like elements employed in other embodiments described herein is omitted for sake of brevity. In various embodiments, the onset component 602 can analyze the clustered adjacency matrices to identify the onset of a root cause failure of the mechanical system.

For example, the onset component 602 can identify one or more adjacency matrices that are adjacent, within the time sequence of the time series data, to one or more other adjacency matrices of another cluster group. For example, a transition between cluster groups across adjacency matrices arranged in the time sequence can mark a transition between standard operation and non-standard operation of the mechanical system, which can be indicative of a malfunction experienced by one or more of the parts characterized by the times series data. For instance, the onset component 602 can order the clustered adjacency matrices into the time sequence of the time series data based on the time interval associated with the time series data group characterized by the given adjacency matrix. The onset component 602 can determine the onset of a root cause by identifying instances along the time sequence at which an adjacency matrix of the first cluster group is positioned next to an adjacency matrix of the second cluster group. Thereby, the onset component 602 can determine when a root cause occurred, and/or the onset of a root cause, based on a data topology variance in the Granger causal relationships of the time series data, as depicted by the transition from adjacency matrices of a first cluster group to adjacency matrices of a second cluster group along the time sequence.

Figure 7:
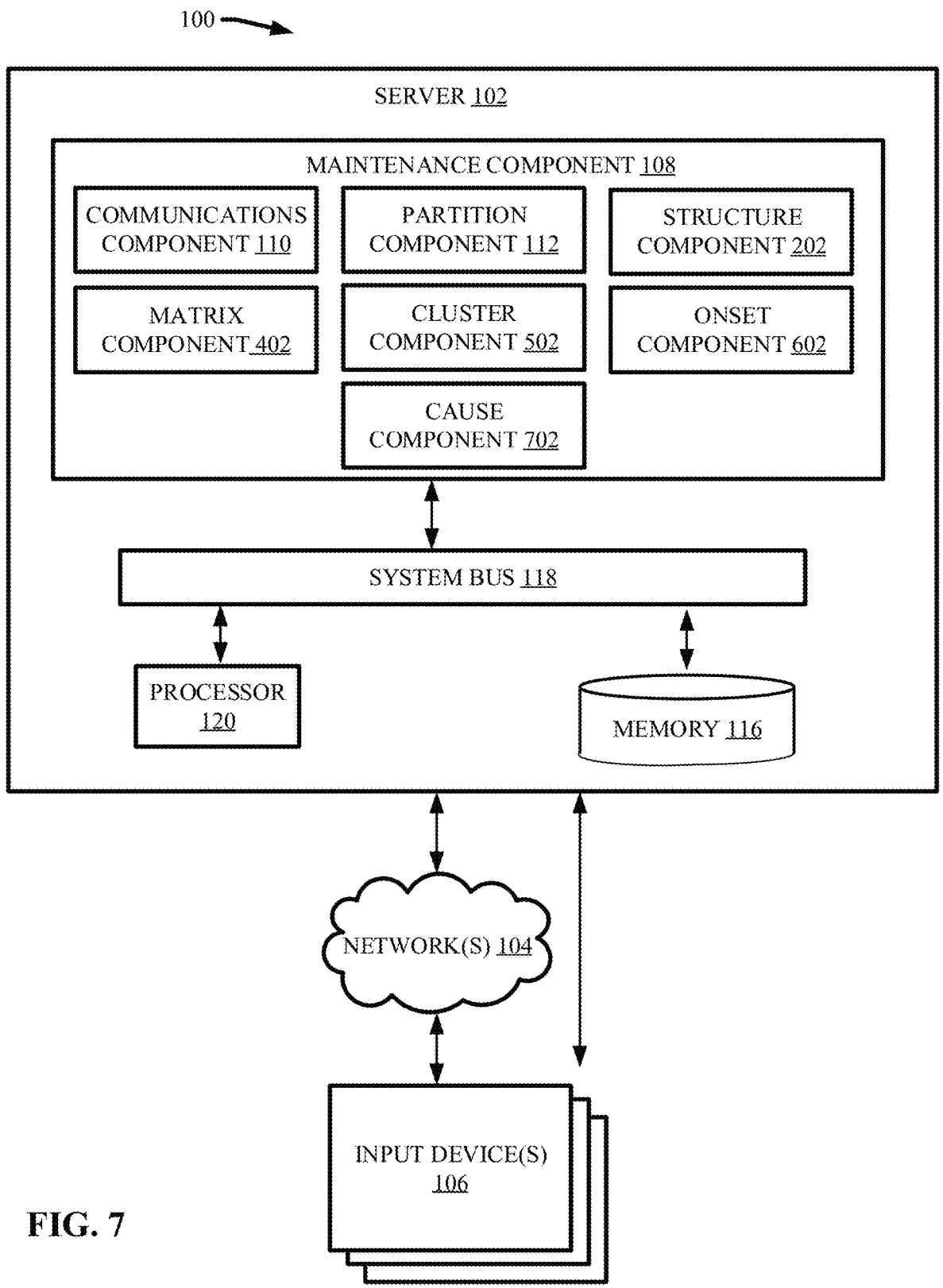
FIG. 7 illustrates a block diagram of an example, non-limiting system that determine one or more root causes of a system failure and/or the onset of a system failure based on time series data in accordance with one or more embodiments described herein.

FIG. 7 illustrates a diagram of the example, non-limiting system 100 further comprising cause component 702 in accordance with one or more embodiments described herein. Repetitive description of like elements employed in other embodiments described herein is omitted for sake of brevity. In various embodiments, the cause component 702 can analyze the identified adjacency matrices of the cluster group transition (e.g., as identified by the onset component 602) to identify one or more time series data variables that correspond to the largest variances between the identified adjacency matrices. In one or more embodiments, the variables associated with the most variance between the identified adjacency matrices can be indicative of the root cause of the mechanical system failure, or the root cause of the potential mechanical system failure.

For example, the cause component 702 can determine the Hamming distance between the time series data variables of the adjacency matrices identified by the onset component 602 (e.g., the adjacency matrices that define a cluster group transition). For instance, the cause component 702 can determine the Hamming distance between variables comprised within a first adjacency matrix and second adjacency matrix; wherein the first adjacency matrix can belong to a first cluster group and be positioned next to the second adjacency matrix, which can belong to a second cluster group. Based on the Hamming distances, the cause component 702 can identify a defined number of variables (e.g., five variables) associated with the greatest variance between the two adjacency matrices. In one or more embodiments, the defined number of variables can be set via the one or more input devices 106. The one or more parts of the mechanical system characterized by the identified variables can be the root cause of a past failure or the root cause of a potential failure. Further, the time at which the adjacency matrices transition from one cluster group to another can be the time at which the identified parts (e.g., as delineated by the identified variables) experienced a malfunction (e.g., can be the time at which the onset of the root cause occurred).

FIG. 8 illustrates a diagram of example, non-limiting graphs 800 and 802 that can demonstrate the efficacy of the MMPC-p-Reduced algorithm 300 using various conditional independency testers in accordance with one or more embodiments described herein. Repetitive description of like elements employed in other embodiments described herein is omitted for sake of brevity. Graphs 800 and 802 can regard execution of the causal discovery algorithm on a synthetic dataset containing 10 time series variables generated by a Kuramoto oscillator.

As shown in graph 800, line 804 can correspond to a conventional causal discovery algorithm that can utilize an exponential number of conditional independency tests to construct the Granger causal graph. For example, line 804 can correspond to the execution of a MMPC algorithm on the time series data using a CCIT conditional independency tester and an α value of 0.1. Lines 806 and 808 can regard execution of the Bayesian network based greedy hill climbing causal discovery algorithms described herein that can employ a polynomial number of the conditional independency tests to construct the Granger causal graph. For example, line 806 can correspond to the execution of MMPC-p-Reduced algorithm 300 using the CCIT conditional independency tester and an α value of 0.1. Also, line 808 can correspond to the execution of MMPC-p-Reduced algorithm 300 using a ParCorr conditional independency tester and an α value of 0.1. As shown in graphs 800 and/or 802, execution of the Bayesian network based greedy hill climbing causal discovery algorithms described herein (e.g., MMPC-p-Reduced algorithm 300) can achieve improved false positive rates and/or false negative rates in comparison with conventional techniques.

Figure 9A:
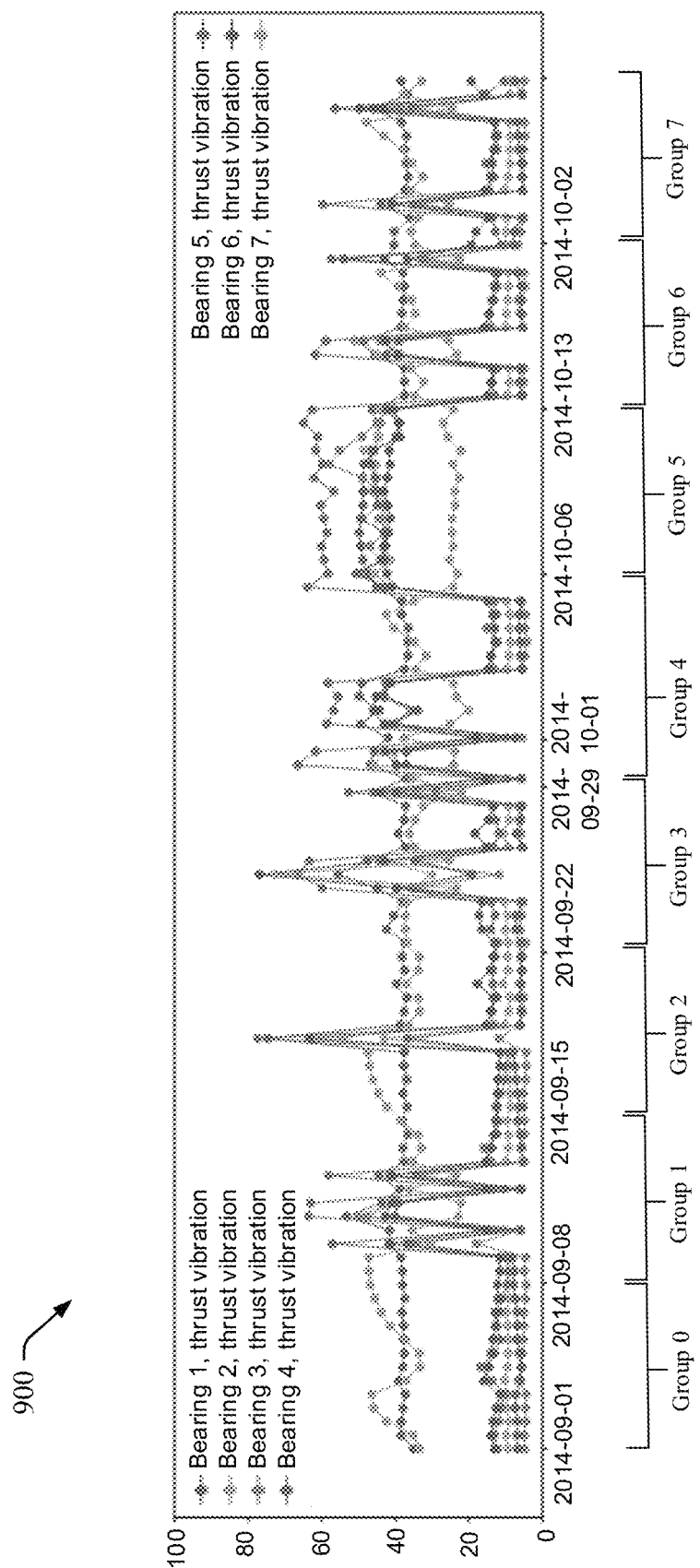
FIG. 9A illustrates a diagram of an example, non-limiting graph that can demonstrate the efficacy of one or more autonomous root cause analysis based on one or more Granger causalities found in time series data in accordance with one or more embodiments described herein.
Figure 9B:
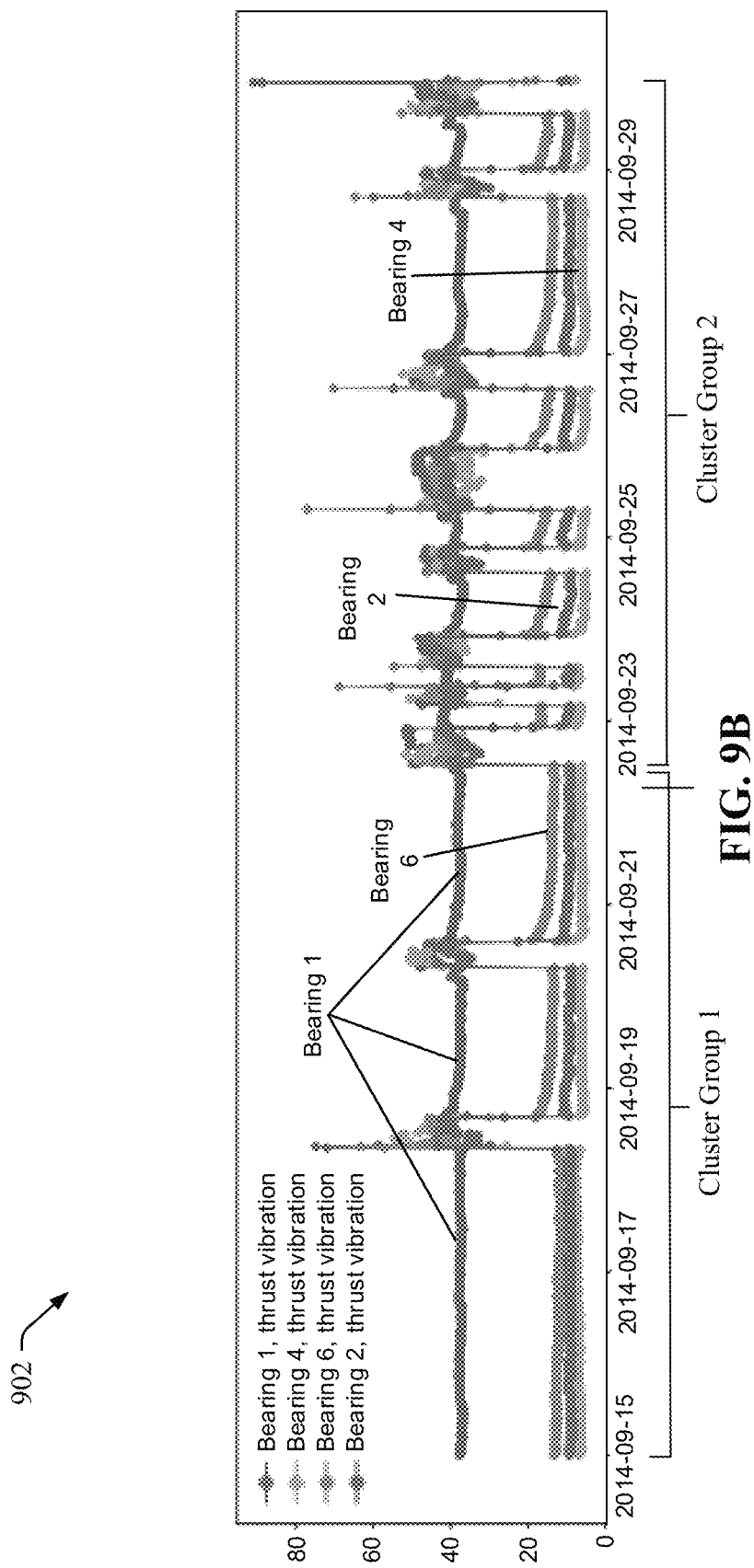
FIG. 9B illustrates a diagram of an example, non-limiting graph that can demonstrate the efficacy of one or more autonomous root cause analysis based on one or more Granger causalities found in time series data in accordance with one or more embodiments described herein.

FIGS. 9A, 9B, and/or 9C illustrates example, non-limiting graphs 900, 902, and/or 904 that can demonstrate the efficacy of the root cause analysis that can be performed by the maintenance component 108 in accordance with the various embodiments described herein. Repetitive description of like elements employed in other embodiments described herein is omitted for sake of brevity. Graphs 900, 902, and/or 904 can regard time series data comprising sensor readings from a steam turbine. The unique operation of the steam turbine can result in one or more properties of the time series data that can make causal discovery challenging. For example, the time series data can exhibit changing properties based on time. For instance, the steam turbine does not operate most nights. Also, during the day the steam turbine can have various operating modes that can change relationships between variables. In another example, the time series data can characterize lagged dependencies and high frequency changes. The behavior of the variables can change rapidly, but a realization of the effect of variable change on other variables can be delayed. For instance, the vibrations of a rotor can change in a matter of seconds, but the effect on the power output of the steam turbine can take minutes to be observed.

To combat the causal discovery challenges, the maintenance component 108 can implement the following heuristics in deriving the analysis presented in graphs 900, 902, and/or 904. First, the structure component 202 can execute the causal discovery algorithm (e.g., MMPC-p-Reduced algorithm 300) on five bootstraps of the time series dataset and construct a weighted causal graph. The weight on an edge of the causal graph can denote the number of bootstraps in which it was detected. Second, the structure component 202 can subsample the time series data at two minute intervals, thereby allowing the causal discovery algorithm (e.g., MMPC-p-Reduced algorithm 300) to discover relationships despite the lag described above.

Graph 900 depicts the Granger causal relationships of the time series data plotted along the time sequence regarding the thrust vibration (e.g., measured by one or more sensors of input devices 106) of seven bearings within the steam turbine. As shown in FIG. 9A, the partition component 112 can organize the time series data into a plurality of groups (e.g., groups 0-7 shown in FIG. 9A). Graph 902 depicts an enlarged portion of graph 900 from September 15 to September 29. As shown in FIG. 9B, the cluster component 502 can cluster the adjacency matrices of the plurality of groups into two cluster groups (e.g., cluster group 1 and cluster group 2 shown in FIG. 9B). For example, time series data groups 0, 1, and 2 can have similar data topology and be clustered into cluster group 1; whereas time series data group 3 can have a different data topology than time series data groups 0, 1, and 2 and can be clustered into cluster group 2. Thereby, the onset component 602 can identify a cluster group transition between the adjacency matrices associated with time series data groups 2 and 3 to determine the onset of a root cause.

Figure 9C:
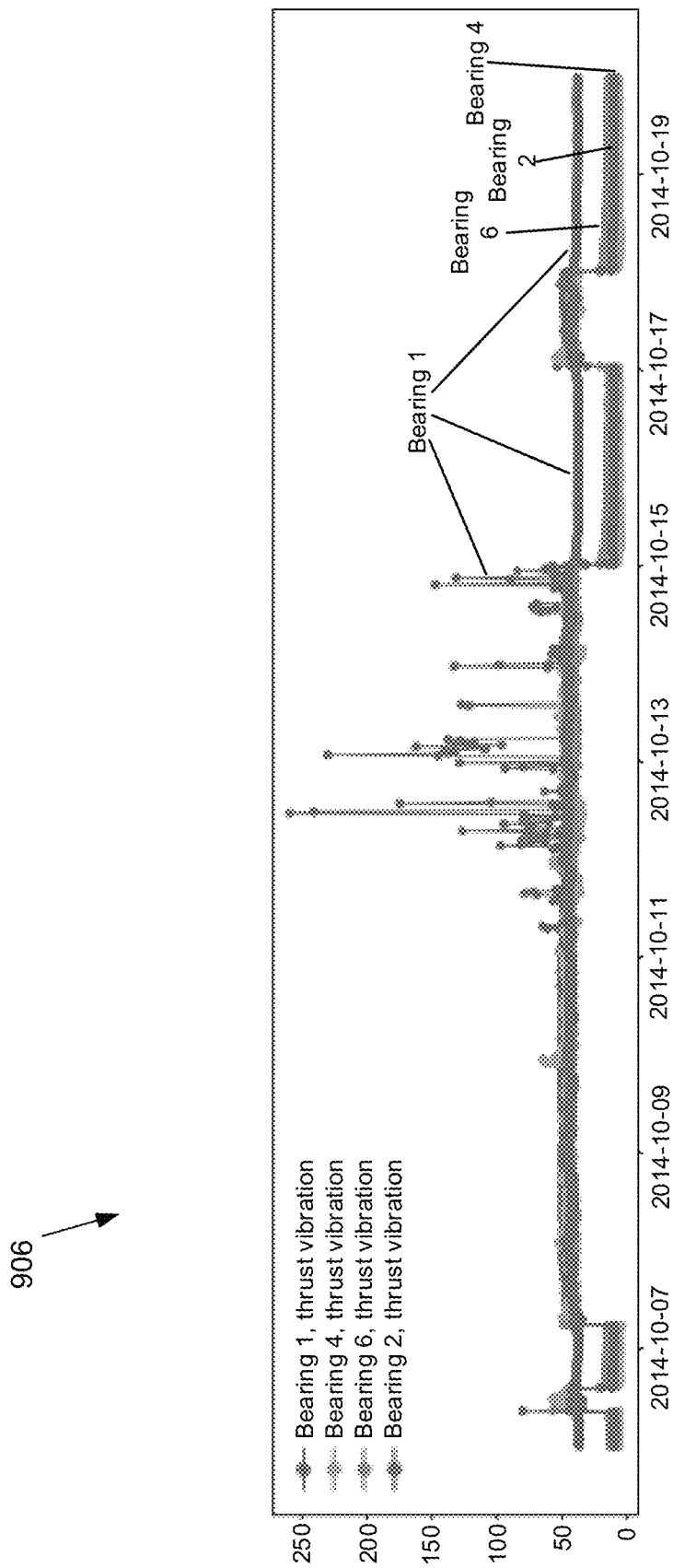
FIG. 9C illustrates a diagram of an example, non-limiting graph that can demonstrate the efficacy of one or more autonomous root cause analysis based on one or more Granger causalities found in time series data in accordance with one or more embodiments described herein.

Furthermore, the cause component 702 can determine the Hamming distances between the variables of the adjacency matrix associated with time series data group 2 and the adjacency matrix associated with time series data group 3. As shown in FIG. 9B, the variables associated with bearings 1, 4, 6, and 2 can be identified (e.g., by the cause component 702) as having the largest Hamming distances. Graph 904 depicts an enlarged portion of graph 900 from October 7 to October 19. As shown in FIG. 9C, bearings 1, 4, 6, and 2 can begin to have a causal effect on variables they did not previously cause due to the onset identified between time series groups 2 and 3 (e.g., the onset on September 22). Further, the causal effect is shown to visually alter operational behavior in time series data group 5. Thus, the maintenance component 108 can determine an onset of a root cause that occurred in time series data group 2 and manifested substantial operational degradation in time series data group 5, and can determine that the likely variables responsible for the root cause are associated with the operation of bearings 1, 4, 6, and 2.

Figure 10:
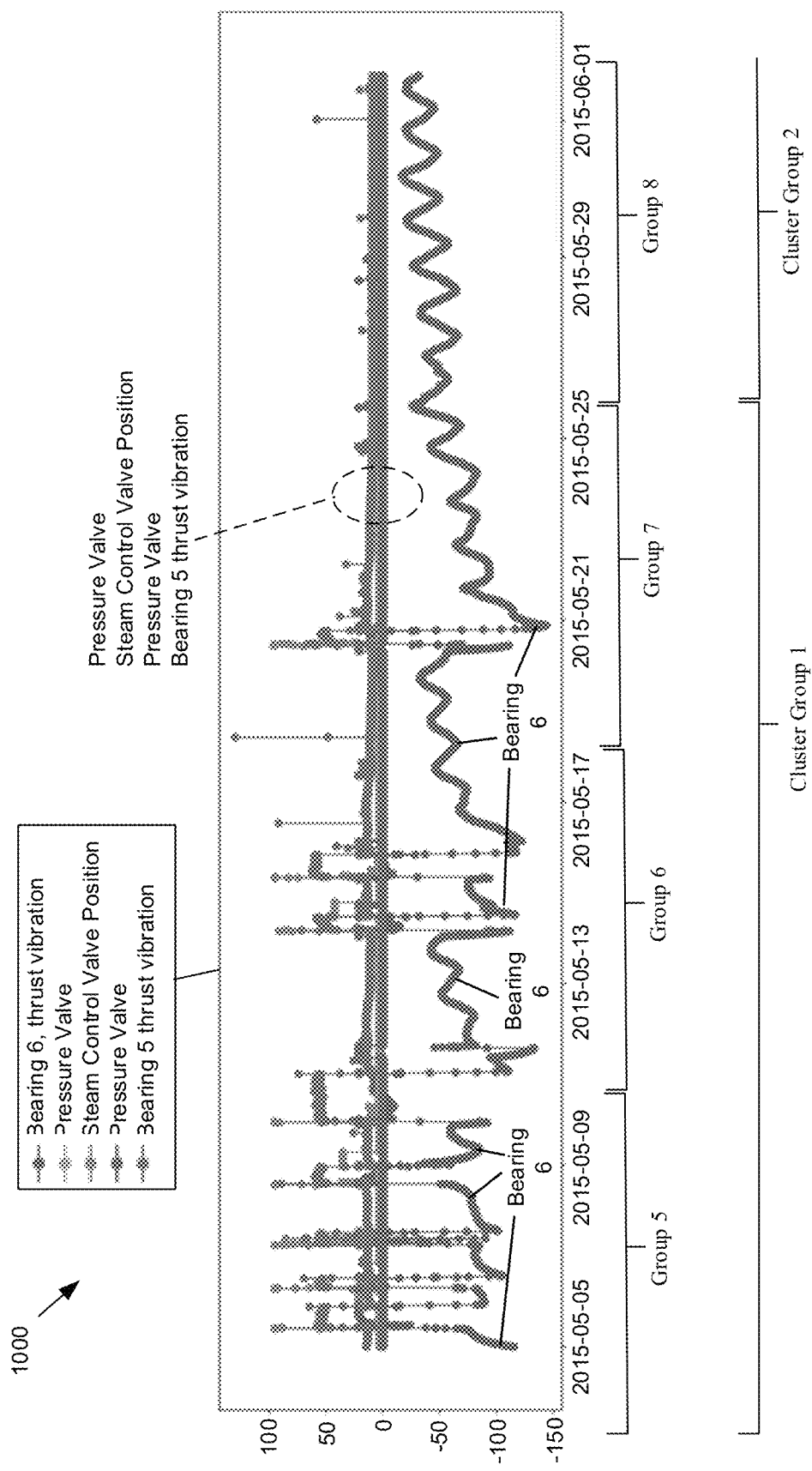
FIG. 10 illustrates a diagram of an example, non-limiting graph that can demonstrate the efficacy of one or more autonomous root cause analysis based on one or more Granger causalities found in time series data in accordance with one or more embodiments described herein.

FIG. 10 illustrates an example, non-limiting graph 1000 that can further demonstrate the efficacy of the root cause analysis that can be performed by the maintenance component 108 in accordance with the various embodiments described herein. Repetitive description of like elements employed in other embodiments described herein is omitted for sake of brevity. Graph 1000 can further regard the time series data of the steam turbine analyzed in FIGS. 9A, 9B, and/or 9C. The steam turbine experienced a second system failure on July 6, and graph 1000 can depict the onset of the root cause, as determined by the maintenance component 108 in accordance with various embodiments described herein. As show in graph 1000, adjacency matrix associated with time series data group 7 and the adjacency matrix associated with time series data group 8 can be clustered into different cluster groups, thereby indicating the onset of a root cause. Also shown in graph 1000 some of the readings associated with pressure and/or control values dwindle over time, wherein a malfunction in the one or more pressure and/or control values at the cluster group transition can correspond to the onset of the root case.

Figure 11:
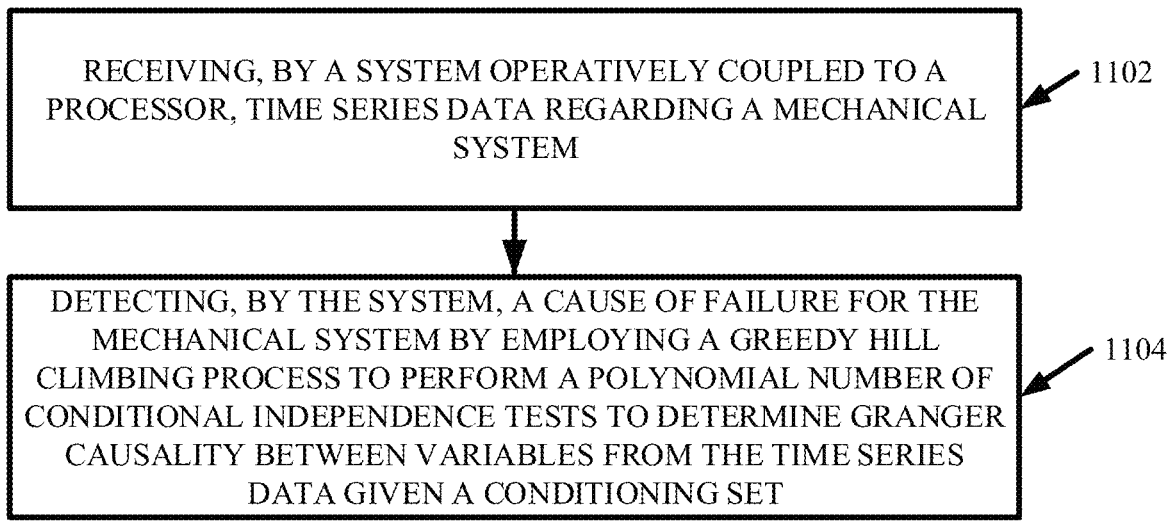
FIG. 11 illustrates a flow diagram of an example, non-limiting computer-implemented method that can facilitate one or more root cause analyses that can identify one or more onsets of a mechanical system failure in accordance with one or more embodiments described herein.

FIG. 11 illustrates a flow diagram of an example, non-limiting computer-implemented method 1100 that can facilitate one or more root cause analyses based on time series data in accordance with one or more embodiments described herein. Repetitive description of like elements employed in other embodiments described herein is omitted for sake of brevity.

At 1102, the computer-implemented method 1100 can comprise receiving (e.g., via communications component 110 and/or input devices 106), by a system 100 operatively coupled to a processor 120, time series data regarding a mechanical system. For example, the time series data can regard the operational status of one or more parts comprised within the mechanical system. In various embodiments, the time series data can be collected, determined, and/or measured by one or more sensors and/or detectors that monitor operation of the mechanical system. Further, in one or more embodiments the time series data can be received via one or more networks 104 (e.g., utilizing one or more cloud computing environments).

At 1104, the computer-implemented method 1100 can comprise detecting (e.g., via maintenance component 108), by the system 100, a cause of failure for the mechanical system by employing a greedy hill climbing process to perform a polynomial number of conditional independence tests to determine Granger causality between variables from the time series data given a conditioning set. For example, the detecting at 1104 can comprise identifying (e.g., via onset component 602) a cluster group transition between adjacency matrices that characterize the Granger causality relationships, in accordance with the various embodiments described herein. Further, the detecting at 1104 can comprise determining (e.g., via cause component 702) the Hamming distance between variables of the adjacency matrices that define the cluster group transition, in accordance with the various embodiments described herein. In one or more embodiments, the variables having the largest Hamming distance can be identified as associated with the root cause of the failure.

Figure 12:
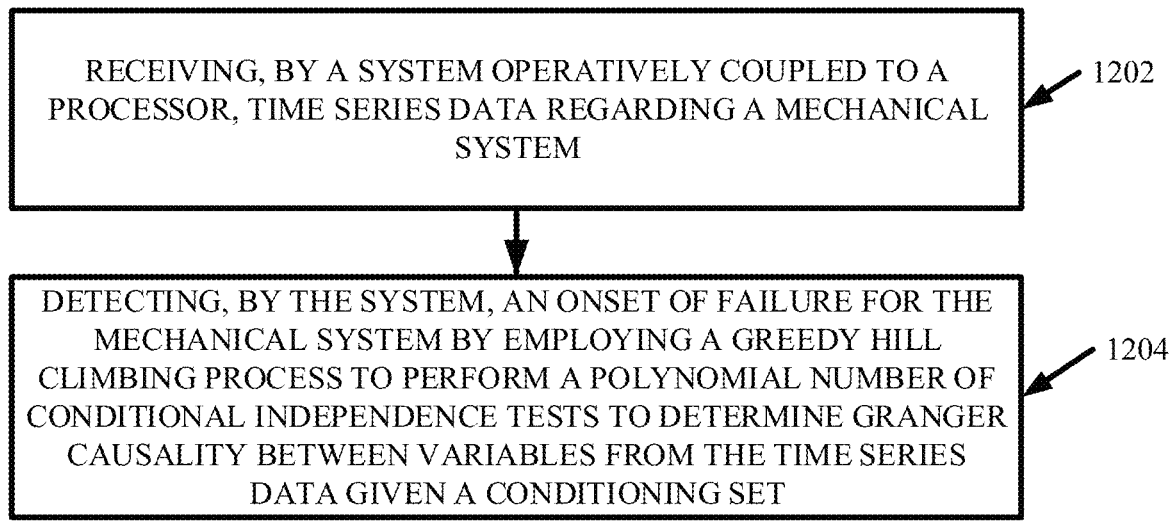
FIG. 12 illustrates a flow diagram of an example, non-limiting computer-implemented method that can facilitate one or more root cause analyses of one or more computer system failures in accordance with one or more embodiments described herein.

FIG. 12 illustrates a flow diagram of an example, non-limiting computer-implemented method 1200 that can facilitate one or more root cause analyses based on time series data in accordance with one or more embodiments described herein. Repetitive description of like elements employed in other embodiments described herein is omitted for sake of brevity.

At 1202, the computer-implemented method 1200 can comprise receiving (e.g., via communications component 110 and/or input devices 106), by a system 100 operatively coupled to a processor 120, time series data regarding a mechanical system. For example, the time series data can regard the operational status of one or more parts comprised within the mechanical system. In various embodiments, the time series data can be collected, determined, and/or measured by one or more sensors and/or detectors that monitor operation of the mechanical system. Further, in one or more embodiments the time series data can be received via one or more networks 104 (e.g., utilizing one or more cloud computing environments).

At 1204, the computer-implemented method 1200 can comprise detecting (e.g., via maintenance component 108), by the system 100, an onset of failure for the mechanical system by employing a greedy hill climbing process to perform a polynomial number of conditional independence tests to determine Granger causality between variables from the time series data given a conditioning set. For example, the detecting at 1204 can comprise identifying (e.g., via onset component 602) a cluster group transition between adjacency matrices that characterize the Granger causality relationships, in accordance with the various embodiments described herein. The cluster group transition can define a marked change in the data topology of the Granger causality relationships, and/or can be indicative of when a malfunction within the mechanical system initially occurred. In one or more embodiments, the computer-implemented method 1200 can detect the onset of failure with regards to an experienced mechanical system failure to facilitate repair. In one or more embodiments, the computer-implemented method 1200 can detect the onset of failure with regards to a potential system failure to facilitate preventative maintenance.

Figure 13:
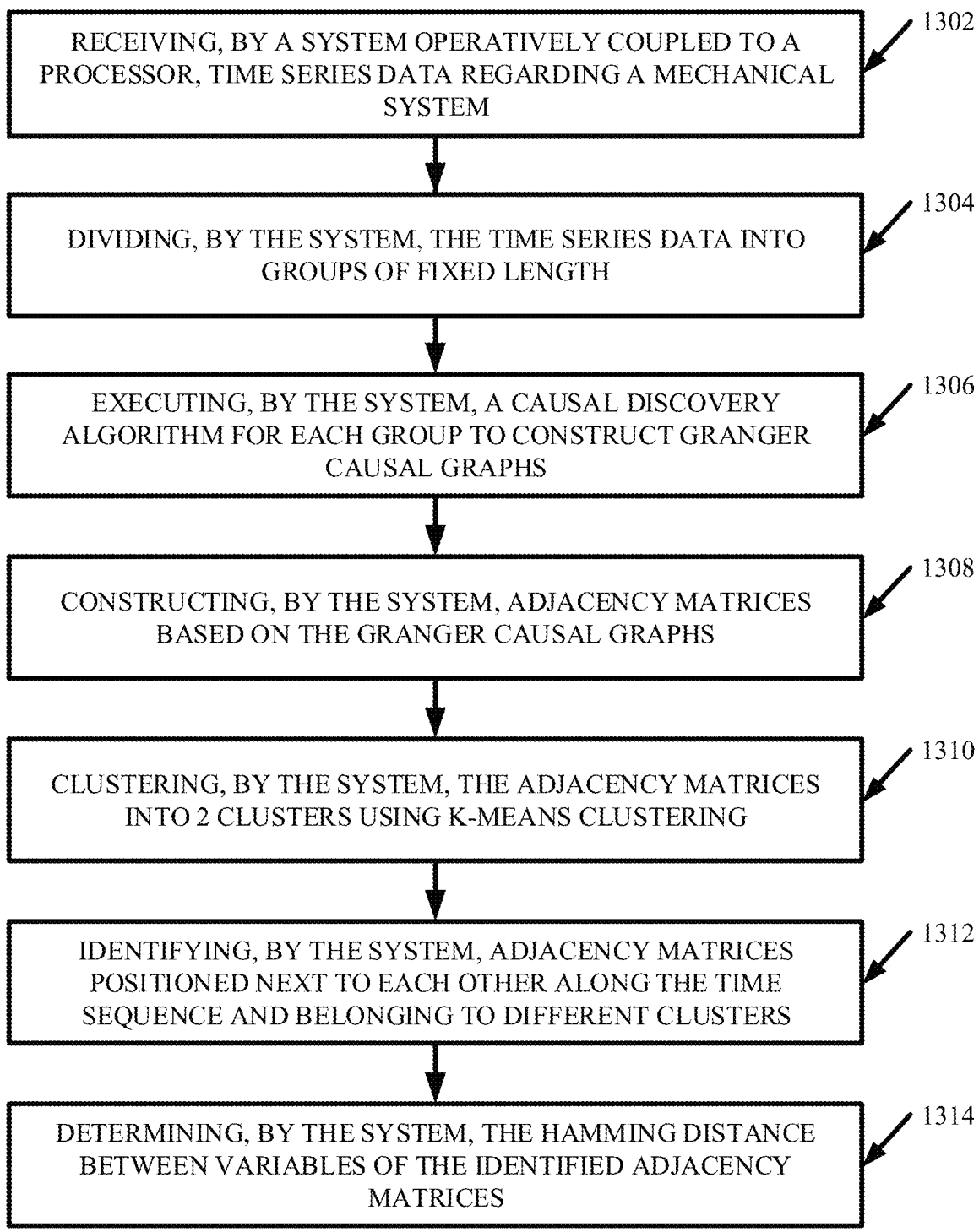
FIG. 13 illustrates a flow diagram of an example, non-limiting computer-implemented method that can facilitate one or more root cause analyses of one or more computer system failures in accordance with one or more embodiments described herein.

FIG. 13 illustrates a flow diagram of an example, non-limiting computer-implemented method 1300 that can facilitate one or more root cause analyses based on time series data in accordance with one or more embodiments described herein. Repetitive description of like elements employed in other embodiments described herein is omitted for sake of brevity.

At 1302, the computer-implemented method 1300 can comprise receiving (e.g., via communications component 110 and/or input devices 106), by a system 100 operatively coupled to a processor 120, time series data regarding a mechanical system. For example, the time series data can regard the operational status of one or more parts comprised within the mechanical system. In various embodiments, the time series data can be collected, determined, and/or measured by one or more sensors and/or detectors that monitor operation of the mechanical system. Further, in one or more embodiments the time series data can be received via one or more networks 104 (e.g., utilizing one or more cloud computing environments).

At 1304, the computer-implemented method 1300 can comprise dividing (e.g., via partition component 112), by the system 100, the time series data into groups of fixed length. For example, the fixed length can be based on a defined interval of time, in accordance with various embodiments described herein. At 1306, the computer-implemented method 1300 can comprise executing (e.g., via structure component 202), by the system 100, one or more causal discovery algorithms for each group to construct one or more Granger causal graphs characterizing the Granger causal relationships in the time series data. For example, the one or more causal discovery algorithms can be a Bayesian network based greedy hill climbing algorithms with conditional independence testers to identify the Granger causal graph over the time series data, such as MMPC-p-Reduced algorithm 300, in accordance with various embodiments described herein.

At 1308, the computer-implemented method 1300 can comprise constructing (e.g., via matrix component 402), by the system 100, one or more adjacency matrices based on the Granger causal graphs. For example, the one or more adjacency matrices can include the candidate parents indexed with regards to each variable of the time series data, in accordance with the various embodiments described herein. At 1310, the computer-implemented method 1300 can comprise clustering (e.g., via cluster component 502), by the system 100, the one or more adjacency matrices into two cluster groups using K-means clustering. For example, a first cluster group can be associated with one or more standard operating states of the mechanical system, and/or a second cluster group can be associated with one or more non-standard operating states of the mechanical system (e.g., operations comprising one or more malfunctions), in accordance with the various embodiments described herein.

At 1312, the computer-implemented method 1300 can comprise identifying (e.g., by the onset component 602), by the system 100, adjacency matrices positioned next to each other along the time sequence and belonging to different cluster groups. For example, the identified adjacency matrices can define a cluster group transition along the time sequence, in accordance with the various embodiments described herein. Further, the cluster group transition can be indicative of an onset of a root cause and/or a potential failure of the mechanical system. At 1314, the computer-implemented method 1300 can comprise determining (e.g., via cause component 702), by the system 100, the Hamming distance between variables of the identified adjacency matrices. For example, variables having the largest Hamming distance between the adjacency matrices that define the cluster group transition can be associated with the root cause of failure, or potential failure, of the mechanical system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
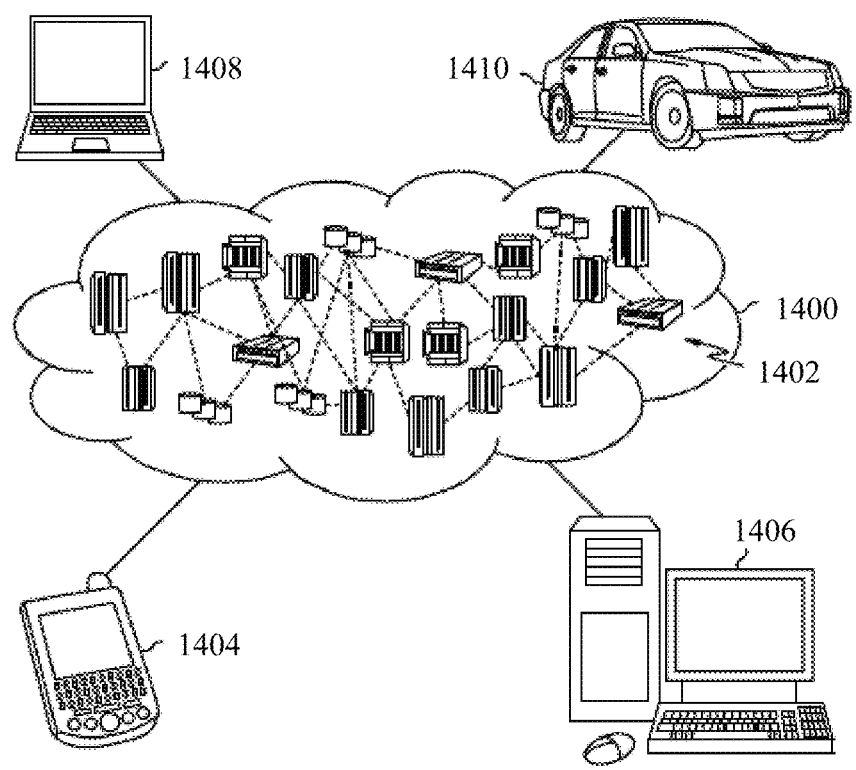
FIG. 14 depicts a cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
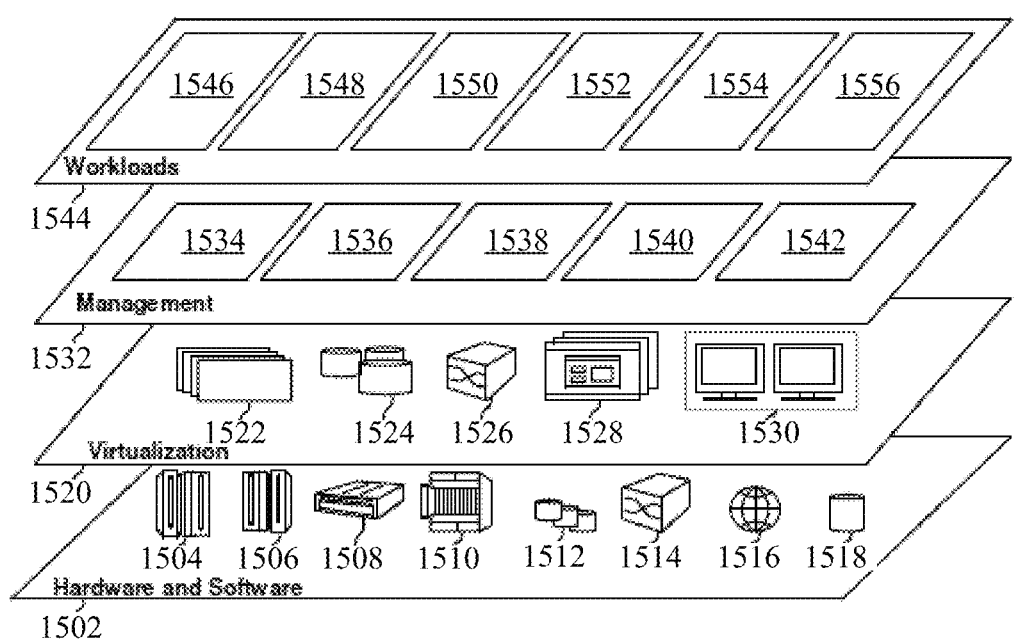
FIG. 15 depicts abstraction model layers in accordance with one or more embodiments described herein.

Referring now to FIG. 15, a set of functional abstraction layers provided by cloud computing environment 1400 (FIG. 14) is shown. Repetitive description of like elements employed in other embodiments described herein is omitted for sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and root cause analysis 1556. Various embodiments of the present invention can utilize the cloud computing environment described with reference to FIGS. 14 and 15 to collect time series data regarding one or more mechanical systems and/or perform one or more root cause analyses based on the time series data.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 16:
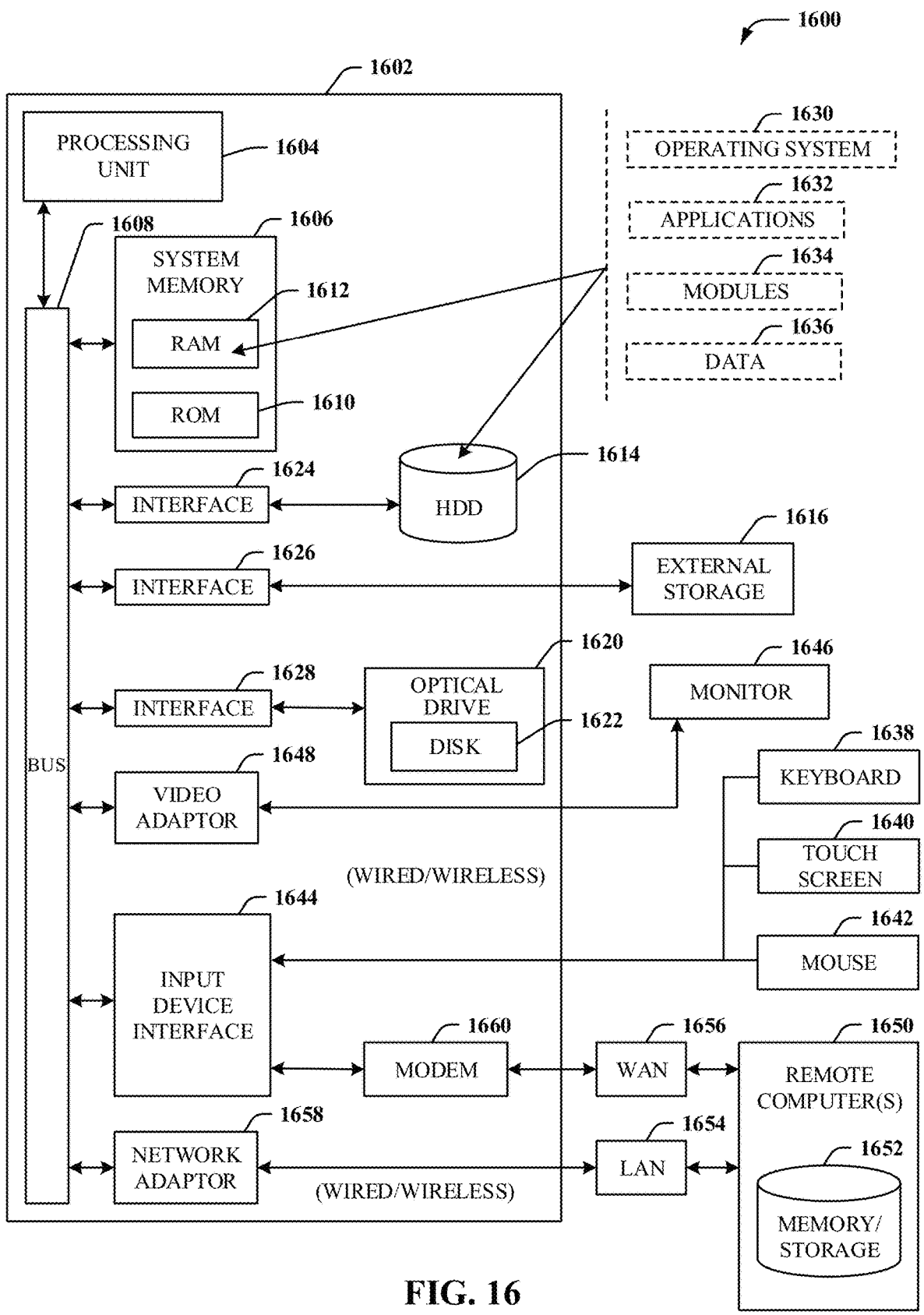
FIG. 16 illustrates a block diagram of an example, non-limiting operating environment in which one or more embodiments described herein can be facilitated.

In order to provide additional context for various embodiments described herein, FIG. 16 and the following discussion are intended to provide a general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed mechanical systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system ("BIOS") can be stored in a non-volatile memory such as ROM, erasable programmable read only memory ("EPROM"), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive ("HDD") 1614 (e.g., EIDE, SATA), one or more external storage devices 1616 (e.g., a magnetic floppy disk drive ("FDD") 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive ("SSD") could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine ("VM") of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1602, e.g., applied at the application execution level or at the operating system ("OS") kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network ("LAN") 1654 and/or larger networks, e.g., a wide area network ("WAN") 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point ("AP") disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes at least one the computer executable components that:
monitors, by the processor, via one or more sensors, execution of a process by a mechanical system, wherein the monitoring comprises collecting process data of the process measured by the one or more sensors;
during the execution of the process by the mechanical system:
detects, by the processor, based on the process data, a failure in the process, and
determine, by the processor, a root cause of the failure based on application of a conditional independence test to the process data, wherein the determination is based on similarity between a first variable in a first time series data extracted from the process data and a second variable in second time series data extracted from the process data, wherein the similarity between the first variable and the second variable is a function of similarity conditioning between the second variable and a third variable in a third time series data, and wherein the root cause initiated onset of a degradation of the mechanical system's operations that led to the failure; and
presents, by the processor, via a display device, information comprising the root cause of the failure to facilitate repair of the mechanical system.

2. The system of claim 1, wherein the conditional independence test utilizes a causal discovery algorithm.

3. The system of claim 1, wherein the second time series data is characterized with a cause of failure based on the similarity conditioning between the second variable and the third variable.

4. The system of claim 1, wherein the third time series data is sourced from the process data or second process data relating to another process.

5. The system of claim 1, wherein the at least one of the computer executable components further:
divides, by the processor, based on a defined period of time, the process data into a collection of time series data, wherein the collection of time series data includes the first time series data having the defined period of time, and the second time series data having the defined period of time; and
generates, by the processor, a first relationship structure for the first time series data and a second relationship structure for the second time series data.

6. The system of claim 5, wherein the at least one of the computer executable components further:
generates, by the processor, a first adjacency matrix for the first time series data, wherein the first adjacency matrix comprises the first relationship structure and characterizes a first relationship between variables in the first time series data; and
generates, by the processor, a second adjacency matrix for the second time series data, wherein the second adjacency matrix comprises the second relationship structure and characterizes a second relationship between variables in the second time series data.

7. The system of claim 6, wherein the at least one of the computer executable components further:
clusters, by the processor, the first adjacency matrix into a first cluster group and the second adjacency matrix into a second cluster group.

8. The system of claim 7, wherein the at least one of the computer executable components further utilizes a K-means clustering algorithm.

9. The system of claim 7, wherein the at least one of the computer executable components further:
identifies, by the processor, a distance between the first adjacency matrix in the first cluster group and the second adjacency matrix in the second cluster group;
compares, by the processor, the distance with a threshold; and
in response to the distance being greater than the threshold, determines, by the processor, the cause of failure, wherein the cause of failure is characterized for the second time series data.

10. A computer-implemented method, comprising:
monitoring, by a processor of a system, via one or more sensors, execution of a process by a mechanical system, wherein the monitoring comprises collecting process data of the process measured by the one or more sensors;
during the execution of the process by the mechanical system:
detecting, by the processor, during the execution of the process by the mechanical system, based on the process data, a failure in the process, and
determining, by the processor, a root cause of the failure based on applying a conditional independence test to the process data, wherein the determination is based on similarity between a first variable in a first time series data extracted from the process data and a second variable in second time series data extracted from the process data, wherein the similarity between the first variable and the second variable is a function of similarity conditioning between the second variable and a third variable in a third time series data, and wherein the root cause initiated onset of a degradation of the mechanical system's operations that led to the failure; and
presenting, by the processor, via a display device, information comprising the root cause of the failure to facilitate repair of the mechanical system.

11. The computer-implemented method of claim 10, wherein the second time series data is characterized with a cause of failure based on the similarity conditioning between the second variable and the third variable.

12. The computer-implemented method of claim 10, further comprising:
dividing, by the processor, based on a defined period of time, the process data into a collection of time series data, wherein the collection of time series data includes the first time series data having the defined period of time, and the second time series data having the defined period of time.

13. The computer-implemented method of claim 12, further comprising:
generating, by the processor, a first relationship structure for the first time series data and a second relationship structure for the second time series data.

14. The computer-implemented method of claim 13, further comprising:
generating, by the processor:
a first adjacency matrix for the first time series data, wherein the first adjacency matrix comprises the first relationship structure and characterizes a first relationship between variables in the first time series data; and a second adjacency matrix for the second time series data, wherein the second adjacency matrix comprises the second relationship structure and characterizes a second relationship between variables in the second time series data.

15. The computer-implemented method of claim 14, further comprising:
clustering, by the processor, the first adjacency matrix into a first cluster group and the second adjacency matrix into a second cluster group.

16. The computer-implemented method of claim 15, further comprising:
identifying, by the processor, a distance between the first adjacency matrix in the first cluster group and the second adjacency matrix in the second cluster group;
comparing, by the processor, the distance with a threshold distance; and
in response to determining that the distance is greater than the threshold, determining, by the processor, a cause of failure for the first time series data, wherein the cause of failure for the first time series data is the cause of failure characterized for the second time series data.

17. A computer program product stored on a non-transitory computer-readable medium and comprising machine-executable instructions, wherein, in response to being executed, the machine-executable instructions cause a processor of a machine to perform operations, comprising:
monitoring, by the processor, via one or more sensors, execution of a process by a mechanical system, wherein the monitoring comprises collecting process data of the process measured by the one or more sensors;
during the execution of the process by the mechanical system:
detecting, by the processor, by the system, during the execution of the process by the mechanical system, based on the process data, a failure in the process, and
determining, by the processor, a root cause of the failure based on applying a conditional independence test to the process data, wherein the determination is based on similarity between a first variable in a first time series data extracted from the process data and a second variable in second time series data extracted from the process data, wherein the similarity between the first variable and the second variable is a function of similarity conditioning between the second variable and a third variable in a third time series data, and the second time series data is characterized with a cause of failure based on the similarity conditioning between the second variable and the third variable, and wherein the root cause initiated onset of a degradation of the mechanical system's operations that led to the failure; and
presenting, by the processor, via a display device, information comprising the root cause of the failure to facilitate repair of the mechanical system.

18. The computer program product according to claim 17, wherein the operations further comprise:
dividing, by the processor, based on a defined period of time, the process data into a collection of time series data, wherein the collection of time series data includes the first time series data having the defined period of time, and the second time series data having the defined period of time; and
generating, by the processor, a first relationship structure for the first time series data and a second relationship structure for the second time series data.

19. The computer program product according to claim 18, wherein the operations further comprise:
generating, by the processor:
a first adjacency matrix for the first time series data, wherein the first adjacency matrix comprises the first relationship structure and characterizes a first relationship between variables in the first time series data;
a second adjacency matrix for the second time series data, wherein the second adjacency matrix comprises the second relationship structure and characterizes a second relationship between variables in the second time series data; and
clustering the first adjacency matrix into a first cluster group and the second adjacency matrix into a second cluster group.

20. The computer program product according to claim 19, wherein the operations further comprise:
identifying, by the processor, a distance between the first adjacency matrix in the first cluster group and the second adjacency matrix in the second cluster group;
comparing, by the processor, the distance with a threshold; and
in response to the distance is greater than the threshold, determining, by the processor, the cause of failure, wherein the cause of failure is the cause of failure characterized for the second time series data.

* * * * *